United States Patent
Rong et al.

(10) Patent No.: US 12,528,077 B2
(45) Date of Patent: *Jan. 20, 2026

(54) CARBON-COATED NICKEL OXIDE NANOCOMPOSITE MATERIAL, PREPARATION METHOD THEREFOR AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Junfeng Rong, Beijing (CN); Peng Yu, Beijing (CN); Jingxin Xie, Beijing (CN); Guobiao Xu, Beijing (CN);

(Continued)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 804 days.

This patent is subject to a terminal disclaimer.

(21) Appl. No.: 17/755,070

(22) PCT Filed: Oct. 20, 2020

(86) PCT No.: PCT/CN2020/122090
§ 371 (c)(1),
(2) Date: Apr. 20, 2022

(87) PCT Pub. No.: WO2021/078112
PCT Pub. Date: Apr. 29, 2021

(65) Prior Publication Data
US 2022/0401929 A1 Dec. 22, 2022

(30) Foreign Application Priority Data

Oct. 21, 2019 (CN) .......................... 201911001538.3
Oct. 21, 2019 (CN) .......................... 201911002419.X
(Continued)

(51) Int. Cl.
*B01J 23/755* (2006.01)
*B01J 21/18* (2006.01)
(Continued)

(52) U.S. Cl.
CPC .............. *B01J 23/755* (2013.01); *B01J 21/18* (2013.01); *B01J 35/398* (2024.01); *B01J 35/45* (2024.01);
(Continued)

(58) Field of Classification Search
CPC ........ B01J 23/755; B01J 21/18; B01J 35/398; B01J 37/0221; B01J 37/04; B01J 37/088; B01J 37/18; B01J 2523/847
See application file for complete search history.

(56) References Cited

U.S. PATENT DOCUMENTS

| | | |
|---|---|---|
| 2004/0065619 A1 | 4/2004 | Klabunde et al. |
| 2014/0099559 A1 | 4/2014 | Parans et al. |

FOREIGN PATENT DOCUMENTS

| | | | | |
|---|---|---|---|---|
| CN | 103191767 A | | 7/2013 | |
| CN | 103647072 A | * | 3/2014 | ............ H01M 4/523 |

(Continued)

OTHER PUBLICATIONS

CN 103647072 A English machine translation.*
(Continued)

*Primary Examiner* — Michael Forrest
*Assistant Examiner* — Nicole Lee Quist
(74) *Attorney, Agent, or Firm* — NKL Law; Allen Xue

(57) ABSTRACT

A carbon-coated nickel oxide nanocomposite material, its preparation, and application thereof are provided. The nanocomposite material contains carbon-coated nickel oxide nanoparticles having a core-shell structure including an outer shell that is a graphitized carbon film optionally doped (Continued)

with nitrogen and an inner core comprising nickel oxide nanoparticle(s). The nanocomposite material has a carbon content of from greater than 0 wt % to not greater than about 5 wt %, based on the weight of the nanocomposite material.

16 Claims, 15 Drawing Sheets

(72) Inventors: Mingsheng Zong, Beijing (CN); Genghuang Wu, Beijing (CN); Weiguo Lin, Beijing (CN); Hongbo Ji, Beijing (CN)

(30) Foreign Application Priority Data

Jun. 5, 2020 (CN) .......................... 202010503588.8
Jun. 5, 2020 (CN) .......................... 202010503595.8

(51) Int. Cl.
| | | |
|---|---|---|
| B01J 35/30 | (2024.01) | |
| B01J 35/45 | (2024.01) | |
| B01J 37/02 | (2006.01) | |
| B01J 37/04 | (2006.01) | |
| B01J 37/08 | (2006.01) | |
| B01J 37/18 | (2006.01) | |

(52) U.S. Cl.
CPC ........... *B01J 37/0221* (2013.01); *B01J 37/04* (2013.01); *B01J 37/088* (2013.01); *B01J 37/18* (2013.01); *B01J 2235/15* (2024.01); *B01J 2235/30* (2024.01); *B01J 2523/847* (2013.01)

(56) References Cited

FOREIGN PATENT DOCUMENTS

| | | | | |
|---|---|---|---|---|
| CN | 104815983 A | 8/2015 | | |
| CN | 105381800 A | 3/2016 | | |
| CN | 105381801 A | 3/2016 | | |
| CN | 106944123 A | 7/2017 | | |
| CN | 107469824 A | 12/2017 | | |
| CN | 107497436 A | 12/2017 | | |
| CN | 107946560 A | 4/2018 | | |
| CN | 108212194 A | 6/2018 | | |
| CN | 108856706 A | * | 11/2018 | ......... B01D 53/8668 |
| CN | 109786746 A | * | 5/2019 | |
| WO | 2016159878 A1 | 10/2016 | | |
| WO | 2019020086 A1 | 1/2019 | | |

OTHER PUBLICATIONS

CN108856706a, machine translation (Year: 2018).*
Zhiqing Jia et al., "Facile synthesis of N-doped carbon-coated nickel oxide nanoparticles embedded in N-doped carbon sheets for reversible lithium storage", Journal of Alloys and Compounds, 2018, 745, 147-154.*
CN 109786746 A machine translation (Year: 2019).*
CN 103647072 A machine translation (Year: 2019).*
WO 2019020086 A machine translation (Year: 2019).*
Qi et al., "Nitrogen doped porous hollow carbon spheres for enhanced benzene removal", Separation and purification Technology, 2017, 188, 112-118 (Year: 2017).*
Yu, Jianguo et al.; "CN107469824A Database WPI Week 201804"; Thomson Scientific, AN 2017-87779G, XP002810324; Dec. 15, 2017; pp. 1-2.
Zhou, Penghang et al.; "CN104815983A Database WPI, Week 201572", Thomson Scientific, AN 2015-57470F, XP002810325; Aug. 5, 2015; pp. 1-3.

* cited by examiner

CARBON-COATED NICKEL OXIDE NANOCOMPOSITE MATERIAL, PREPARATION METHOD THEREFOR AND USE THEREOF

CROSS REFERENCE TO RELATED APPLICATIONS

This application is a U.S. national entry of PCT international application no. PCT/CN2020/122090, filed on Oct. 20, 2020, which claims priorities of Chinese patent application No. 201911001538.3, titled "carbon-coated nickel oxide nanocomposite material, its preparation and application thereof", filed on Oct. 21, 2019, Chinese patent application No. 201911002419.X, titled "method for catalytically combusting volatile organic compounds", filed on Oct. 21, 2019, Chinese patent application No. 202010503595.8, titled "carbon-coated nickel oxide nanocomposite material, its preparation and application thereof", filed on Jun. 5, 2020, and Chinese patent application No. 202010503588.8, titled "method for catalytically combusting volatile organic compounds", filed on Jun. 5, 2020, the contents of which are incorporated herein by reference in their entirety.

TECHNICAL FIELD

The present application relates to the field of catalysis technology, particularly to a carbon-coated nickel oxide nanocomposite material, its preparation and application thereof.

BACKGROUND ART

Transition metal oxides have excellent catalytic and electromagnetic performances, and thus are research hotspot in the field of inorganic materials, and have wide applications in energy storage materials, catalytic materials, magnetic recording materials and biomedicines. Carbon materials have good conductivity, good chemical/electrochemical stability and high structural strength. Coating of nanoparticles of active metal or metal oxide with carbon material can effectively improve the conductivity and stability of the nano material, and has an confinement effect on the nanoparticles, so that they are not easy to agglomerate. In recent years, carbon-coated nanomaterials are widely used in the fields of electrocatalysis, supercapacitor materials, negative electrode materials for lithium-ion batteries, bioengineering and the like, but their use in the catalysis field is limited.

Nitrous oxide ($N_2O$), also known as laughing gas, is an important greenhouse gas with a Global Warming Potential (GWP) of 310 times the GWP of $CO_2$ and 21 times the GWP of $CH_4$; in addition, $N_2O$ has an average life of about 150 years in the atmosphere, and is also a main source of NOx in stratosphere, and it can not only seriously damage the ozone layer, but also has strong greenhouse effect.

The domestic production of adipic acid mainly adopts a cyclohexanol nitric acid oxidation method, in which the cyclohexanol is oxidized by nitric acid to produce the adipic acid. This method has mature technology, and can provide a high product yield and purity. But, the nitric acid consumption of the method is large, and a great amount of $N_2O$ is produced in the reaction process, and the tail gas discharged from the production process is concentrated, large in amount and high in concentration (36-40%). At present, 150 thousand tons of adipic acid are produced annually by the cyclohexanol nitric acid oxidation method, and the annual emission of $N_2O$ can reach 45 thousand tons. Therefore, purification of the tail gas from adipic acid plants and effective control and elimination of $N_2O$ have become a research focus in the field of environmental catalysis.

Direct catalytic decomposition method can decompose $N_2O$ into nitrogen and oxygen, and is the most effective and clean technology for eliminating $N_2O$. Catalyst is the core of the direct catalytic decomposition method. Currently developed and reported catalysts for decomposing $N_2O$ mainly include noble metal catalysts, ion-exchanged molecular sieve catalysts and transition metal oxide catalysts. Noble metal catalysts (such as Rh and Ru) have high low-temperature catalytic activity (in the range of 250-350° C. and can be used for efficiently decomposing $N_2O$) on $N_2O$ decomposition, but the large-scale application of noble metal catalysts is limited by their high price. The price of molecular sieve catalysts and transition metal oxide catalysts is much lower than that of noble metal catalysts, but the activity for $N_2O$ catalytic decomposition of these two kinds of catalysts currently available is relatively low, the temperature range of efficient decomposition is 450-550° C., and high-concentration laughing gas needs to be diluted to about 0.5-2% during decomposition, which greatly increases the industrial cost.

Volatile Organic Compounds (VOCs) are organic compounds having a saturated vapor pressure at room temperature of greater than 70 Pa and a boiling point at atmospheric pressure of 260° C. or lower. There are various types of VOCs, which mainly include alkanes, aromatics, esters, aldehydes, halogenated hydrocarbons and the like. Most of VOCs have pungent odors and may cause poisoning and carcinogenesis, and VOCs are important sources for forming photochemical smog and atmospheric particulate matters PM 2.5. As a large country of manufacturing industry, the discharge amount of VOCs in China is the largest over the world, and VOCs discharged from industrial production are harmful to human health and seriously damage the ecological environment due to their high discharge concentration, long duration and great varieties in pollutants. In recent years, the systematic prevention and treatment of VOCs as a pollutant have been carried out in China, and the development of efficient VOCs purification technology and the control of the discharge amount of VOCs have become important subjects in the field of environmental protection.

There are two main types of purification methods for VOCs: the first type is physical absorption and adsorption methods, which are commonly used for recovering high-concentration (>5000 mg/m$^3$) VOCs, but such methods have poor purification effect on low-concentration (<1000 mg/m$^3$) VOCs, have low adsorption efficiency, and will generate secondary wastewater or solid waste through adsorption, absorption and elution. The second type is chemical reaction methods, which convert VOCs into non-toxic chemicals through oxidization by introducing thereinto an oxidizing agent. Such methods are mainly used for treating medium-concentration or low-concentration VOCs.

Among chemical reaction methods, combustion technology is a widely used technology, which may be further divided into direct flame combustion and catalytic combustion. The direct flame combustion is to directly combust VOCs as a fuel, which has to be carried out at a high temperature of about 600-900° C., and thus has a high energy consumption and may generate black smoke and peculiar smell due to incomplete combustion. The catalytic combustion is a typical gas-solid catalytic reaction, of which the essence is to catalyze the reaction between VOCs adsorbed on the catalyst surface and $O_2$ to produce harmless $CO_2$ and $H_2O$. The reaction is normally carried out at a temperature of 300-500° C., and thus the energy consumption is low, and no secondary pollution will be generated. Therefore, catalytic combustion is an energy-saving, effective, economical and environment-friendly technology.

Catalyst is the core of catalytic combustion technology. Currently developed and reported catalysts for catalyzing and burning VOCs mainly include noble metal catalysts and non-noble metal oxide catalysts. Among them, noble metal catalysts (such as Pt, Ru, Au, Pd, etc.) have good performance, but are expensive and easy to be poisoned; non-noble metal oxide catalysts (such as $Co_2O_3$, $MnO_2$, $CeO_2$, CuO, $TiO_2$, perovskite and the like) are low in cost and not easy to be poisoned, but have relatively low catalytic activity.

Therefore, development of a low-cost and high-performance catalyst applicable to the above-mentioned fields is a problem to be solved.

It should be noted that the information disclosed in this Background Art section is only provided to help the understanding of the background of the present application and therefore it may comprise information that does not constitute prior art that is already known to a person of ordinary skill in the art.

SUMMARY OF THE INVENTION

An object of the present application is to provide a carbon-coated nickel oxide nanocomposite material, its preparation and application thereof, the nanocomposite material comprises carbon-coated nickel oxide nanoparticles having a core-shell structure including a graphitized carbon shell optionally doped with nitrogen and a nickel oxide core, and the carbon-coated nickel oxide nanoparticles have excellent activity when used as a catalyst active component, can be effectively used for catalytic decomposition of nitrous oxide and catalytic combustion of volatile organic compounds, solve the problem in elimination of high concentration $N_2O$ generated in the production process of adipic acid plants, nitric acid plants and the like, and the problem in purification of VOCs, and thus have important significance for protecting the environment, reducing atmospheric pollution and the like, and have good industrial application prospects.

To achieve the above object, the present application provides in an aspect a carbon-coated nickel oxide nanocomposite material comprising carbon-coated nickel oxide nanoparticles having a core-shell structure including an outer shell that is a graphitized carbon film optionally doped with nitrogen and an inner core comprising nickel oxide nanoparticle(s), wherein the nanocomposite material has a carbon content of from greater than 0 wt % to not greater than about 5 wt %, based on the weight of the nanocomposite material.

Preferably, the nanocomposite material has a carbon element content of about 15-60 mol % as determined by X-ray photoelectron spectroscopy; and/or the nanocomposite material has a ratio of carbon element mass content determined by X-ray photoelectron spectroscopy to carbon element mass content determined by elemental analysis of not less than about 10.

Preferably, the nanocomposite material has a Raman spectrum with a ratio of the intensity of the G peak near 1580 $cm^{-1}$ to the intensity of the D peak near 1320 $cm^{-1}$ of greater than about 2.

In another aspect, the present application provides a method for preparing a carbon-coated nickel oxide nanocomposite material, comprising the steps of:

i) mixing a nickel source, a polybasic organic carboxylic acid and optionally a nitrogen-containing compound in a solvent to form a homogeneous solution;
ii) removing the solvent from the homogeneous solution to obtain a precursor;
iii) pyrolyzing the precursor under an inert or reducing atmosphere; and
iv) heat treating the pyrolyzed product in the presence of oxygen to obtain the nanocomposite material, wherein the nickel source is preferably one or more selected from the group consisting of nickel powder, nickel hydroxide, nickel oxide, soluble organic acid salts of nickel, basic carbonates of nickel and carbonates of nickel;

the polybasic organic carboxylic acid is preferably one or more selected from the group consisting of citric acid, maleic acid, trimesic acid, terephthalic acid, gluconic acid, malic acid, ethylenediaminetetraacetic acid, dipicolinic acid, iminodi acetic acid, diethylenetriaminepentaacetic acid and 1,3-propanediaminetetraacetic acid; and the nitrogen-containing compound is preferably one or more selected from the group consisting of urea, melamine, dicyanodiamine, hexamethylenetetramine and amino acids.

Preferably, the heat treatment of step iv) comprises introducing an oxygen-containing gas into the pyrolyzed product and heating, wherein the oxygen-containing gas has an oxygen concentration by volume of about 10-40%, the temperature of the heat treatment is about 200-500° C., and the time of the heat treatment is about 0.5-10 h.

In a further aspect, the present application provides a method for catalyzing the decomposition of nitrous oxide, comprising contacting nitrous oxide with a catalyst for catalytic decomposition to produce nitrogen and oxygen, wherein the catalyst comprises a nanocomposite material according to the present application as an active component.

In yet another aspect, the present application provides a method of treating volatile organic compounds, comprising contacting a volatile organic compound with a catalyst for oxidation reaction, wherein the catalyst comprises a nanocomposite material according to the present application as an active component, Preferably, the oxidation reaction is carried out by bringing a mixed gas containing the volatile organic compound and oxygen into contact with the catalyst for catalytic combustion.

The carbon-coated nickel oxide nanocomposite material according to the present application has a core-shell structure including a graphitized carbon shell optionally doped with nitrogen and a nickel oxide core, and has excellent activity when used as a catalyst for catalyzing $N_2O$ decomposition due to its unique structure and composition. Compared with existing catalysts that require a dilution of $N_2O$ present in industrial waste gas before treatment, the nanocomposite material according to the present application can directly catalyze the decomposition of high-concentration nitrous oxide waste gas generated in industrial production at a lower temperature, with a decomposition rate of 99% or higher, and thus has important significance for protecting the environment and reducing the atmospheric pollution. In addition, the nanocomposite material can also effectively catalyze the oxidation and combustion of VOCs at a lower temperature, which is beneficial to solving the problem in purification of VOCs and reducing air pollution.

BRIEF DESCRIPTION OF THE DRAWINGS

The drawings, forming a part of the present description, are provided to help the understanding of the present application, and should not be considered to be limiting. The present application can be interpreted with reference to the drawings in combination with the Detailed Description hereinbelow. In the drawings.

DETAILED DESCRIPTION OF THE INVENTION

Figure 1:
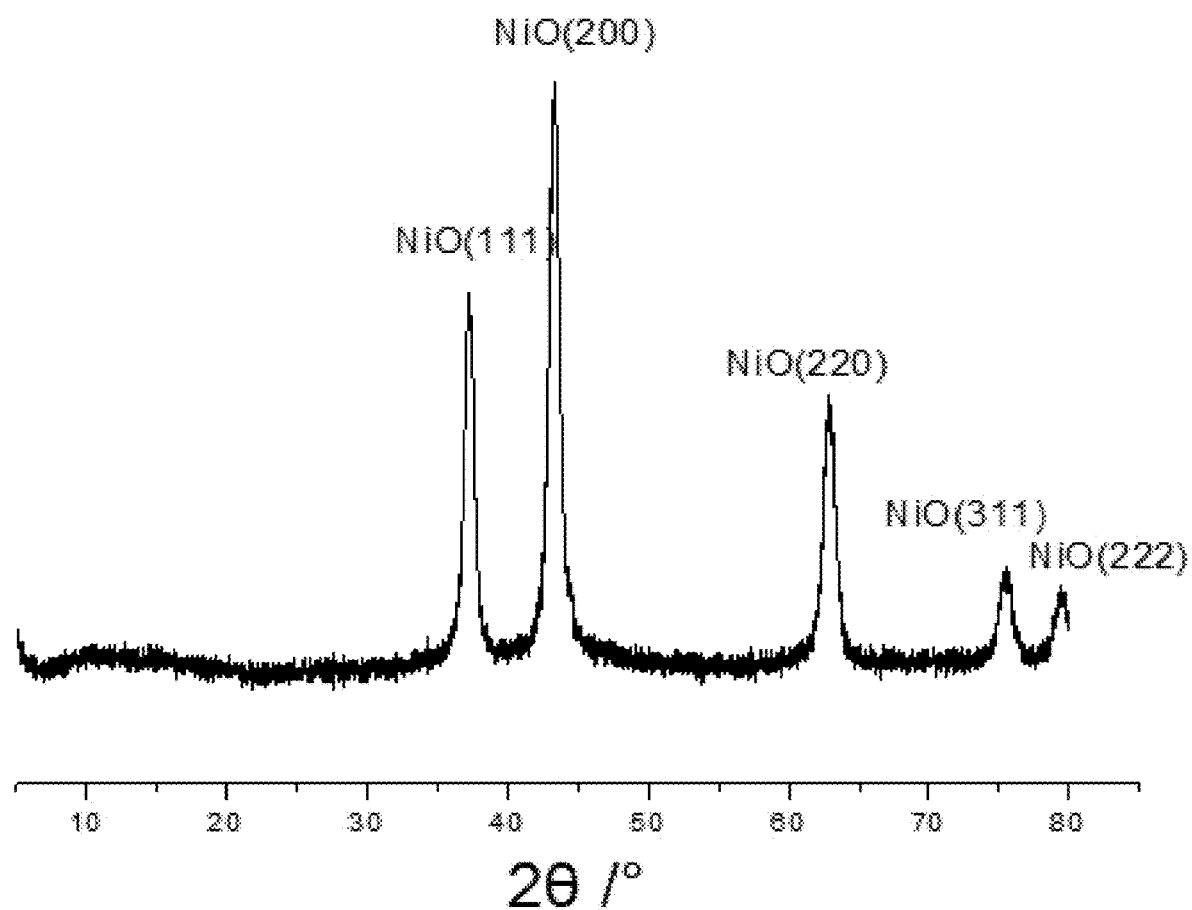
FIG. 1 shows an X-ray diffraction pattern of the nanocomposite material obtained in Example I-1.

The following presents various embodiments, or examples, in order to enable one of ordinary skill in the art to carry out the invention with reference to the description herein. These are, of course, merely examples and are not intended to limit the present application. Any specific numerical value, including the endpoints of a numerical range, described in the context of the present application is not restricted to the exact value thereof, but should be interpreted to further encompass all values close to said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

All of the patent and non-patent documents cited herein, including but not limited to textbooks and journal articles, are hereby incorporated by reference in their entirety.

As used herein, the term "core-shell structure" refers to a core-shell structure having an outer graphitized carbon shell and an inner core comprising nickel oxide nanoparticle(s). The particles of the composite material formed after coating the nickel oxide nanoparticles with the graphitized carbon shell have a spherical or near-spherical shape.

The term "graphitized carbon shell/film" refers to a thin film structure composed mainly of graphitized carbon.

The term "nitrogen" present in the expression "nitrogen-doped" or "doped with nitrogen" refers to nitrogen element, and specifically refers to nitrogen element present in various forms in the formed graphitized carbon layer during the preparation of the carbon-coated nickel oxide nanocomposite material, and the term "nitrogen content" refers to the total content of all forms of nitrogen element.

The term "carbon element content determined by X-ray photoelectron spectroscopy" refers to the relative content of carbon element on the material surface measured by quantitative elemental analysis using an X-ray photoelectron spectrometer as an analysis tool, and is usually expressed in terms of mole percent, and the corresponding mass percent can be obtained by simple conversion.

The term "nitrogen element content determined by X-ray photoelectron spectroscopy" refers to the relative content of nitrogen element on the material surface measured by quantitative elemental analysis using an X-ray photoelectron spectrometer as an analysis tool, and is usually expressed in terms of mole percent.

The term "carbon element content determined by elemental analysis" refers to the relative content of total carbon element of the material measured by quantitative elemental analysis using an elemental analyzer as an analysis tool, and is usually expressed in terms of weight percent.

According to the present application, the space velocity of the reaction refers to the amount of gas treated per unit of mass of the catalyst per unit of time, expressed in ml of reaction gas/(hr·g of catalyst), under the given conditions.

As stated above, in a first aspect, the present application provides a carbon-coated nickel oxide nanocomposite material, comprising carbon-coated nickel oxide nanoparticles having a core-shell structure including an outer shell that is a graphitized carbon film optionally doped with nitrogen, and an inner core comprising nickel oxide nanoparticle(s), wherein the nanocomposite material has a carbon content of from greater than 0 wt % to not greater than about 5 wt %, based on the weight of the nanocomposite material.

In a preferred embodiment, the nanocomposite material consists essentially of the carbon-coated nickel oxide nanoparticles having the core-shell structure.

In a preferred embodiment, the inner core consists essentially of nickel oxide nanoparticle(s).

According to the present application, the carbon content by weight of the nanocomposite material may be the carbon element content determined by elemental analysis. In preferred embodiments, the nanocomposite material has a carbon content of no greater than about 1 wt %, based on the weight of the nanocomposite material, which can be, for example, about 0.1-1 wt %; preferably less than about 1 wt %, and may be, for example, about 0.1-0.99 wt %, about 0.1-0.95 wt %, 0.2-0.95 wt %, 0.3-0.95 wt %, 0.4-0.95 wt %, 0.5-0.95 wt %, 0.5-0.9 wt %, and the like, more preferably about 0.2-0.95 wt %, and particularly preferably about 0.4-0.95 wt %.

According to the present application, the carbon-coated nickel oxide nanocomposite material has a core-shell structure including an outer shell layer and an inner core layer, wherein the outer shell layer is mainly composed of a graphitized carbon film optionally doped with nitrogen, and the graphitized carbon film has a thin film structure mainly composed of graphitized carbon optionally doped with nitrogen and is coated on the surface of nickel oxide nanoparticle(s). The inventors of the present application surprisingly found that the core-shell structure with an outer surface coated with the graphitized carbon film has greatly improved the performance, particularly catalytic performance, of the whole material, although the carbon content of the shell layer is relatively low. Without being bound to any theory, the applicants believe that the graphitized carbon film of the nanocomposite material according to the present application has a certain confinement effect, can effectively avoid agglomeration and growth of nickel oxide nanoparticles in the core, allows a stable catalytic activity of the composite material, and can synergistically increase the catalytic activity of the whole composite material, so that the catalytic activity of the composite material can be significantly improved as compared to that of pure nickel oxide not coated with a graphitic carbon film. In addition, the doped nitrogen can change the element composition of the carbon material, and can regulate and control the electrochemical property and the surface activity of the carbon material, and thus is beneficial to further improving and expanding the functions of the carbon-coated nickel oxide nanocomposite material.

In preferred embodiments, the nanocomposite material of the present application has a carbon element content of from about 15 to about 60 mol %, preferably from about 15 to about 45 mol %, as determined by X-ray photoelectron spectroscopy, and/or a ratio of the carbon element mass content determined by X-ray photoelectron spectroscopy to the carbon element mass content determined by elemental analysis of not less than about 10, preferably from about 20 to about 40. As described above, the carbon element content determined by X-ray photoelectron spectroscopy refers to the relative content of carbon element on the material surface measured by quantitative elemental analysis using an X-ray photoelectron spectrometer as an analysis tool. The carbon element content determined by elemental analysis refers to the relative content of total carbon element of the material measured by quantitative elemental analysis using an elemental analyzer as an analysis tool. The larger the ratio of the carbon element content determined by X-ray photoelectron spectroscopy to the carbon element content determined by elemental analysis is, the more the carbon present in the nanocomposite material is concentrated on the surface of the material, so that the carbon shell layer, and in turn the core-shell structure, can be formed.

In some preferred embodiments, the outer shell of the core-shell structure is a nitrogen-doped graphitized carbon film, and the nanocomposite material has a nitrogen content determined by X-ray photoelectron spectroscopy of about 0.1-5 mol %, which may be, for example, about 0.1 mol %, about 0.4 mol %, about 2.8 mol %, about 3.6 mol %, about 4.2 mol %, about 4.7 mol %, and the like, preferably about 0.5-4 mol %, more preferably about 0.5-3 mol %.

In a preferred embodiment, the nanocomposite material has a Raman spectrum in which the ratio of the intensity of the G peak near 1580 cm$^{-1}$ to the intensity of the D peak near 1320 cm$^{-1}$ is greater than about 2, preferably greater than about 2 and not greater than about 3. As is well known to those skilled in the art, the D peak and the G peak are both Raman characteristic peaks of the crystal of carbon atom, in which the D peak represents lattice defect of the carbon atom crystal, and the G peak represents in-plane stretching vibration of the sp$^2$ hybridization of the carbon atom. It can be appreciated that, the greater the ratio of the G peak intensity to the D peak intensity, the more graphitic carbon present in the nanocomposite material as compared to the amorphous carbon. In the nanocomposite material of the present application, the carbon element is mainly present in the form of graphitic carbon. The graphitic carbon has better oxidation resistance, and can increase the catalytic activity by cooperating with the nickel oxide nanoparticle(s) in the inner core, thereby improving the performance of the whole composite material.

In a preferred embodiment, the carbon-coated nickel oxide nanoparticles having a core-shell structure have a particle size of about 1-100 nm, preferably about 2-40 nm, such as about 2 nm, about 15 nm, about 20 nm, about 25 nm, about 30 nm, about 35 nm, about 40 nm, and the like.

In a second aspect, the present application provides a method for preparing a carbon-coated nickel oxide nanocomposite material, comprising the steps of:
i) mixing a nickel source, a polybasic organic carboxylic acid and optionally a nitrogen-containing compound in a solvent to form a homogeneous solution;
ii) removing the solvent from the homogeneous solution to obtain a precursor;
iii) pyrolyzing the precursor under an inert or reducing atmosphere; and
iv) heat treating the pyrolyzed product in the presence of oxygen to obtain the nanocomposite material.

In the method according to the present application, a graphitized carbon layer tightly coated on the outer surface of nickel elementary substance is first formed under the reaction of the nickel elementary substance, then the nickel elementary substance in the inner core is converted into nickel oxide through heat treatment in the presence of oxygen, and amorphous carbon is removed at the same time, so that a nanocomposite material of nickel oxide coated by a small amount of graphitic carbon is obtained. In XRD analysis of the nanocomposite material, normally only characteristic peaks of nickel oxide can be observed, and no characteristic peaks of nickel elementary substance is observed, indicating that the nickel in the core of the nanocomposite material is substantially in the form of nickel oxide.

In a particular embodiment, the precursor obtained in step ii) is a water-soluble mixture obtained by dissolving the nickel source, the polybasic organic carboxylic acid and optionally the nitrogen-containing compound in a solvent (e.g. water and ethanol, etc.) to form a homogeneous solution, and evaporating off the solvent, wherein the temperature and method of evaporating the solvent can be those used in prior art, e.g. spray drying at about 80-120° C., or drying in an oven.

In a preferred embodiment, the nickel source may be one or more of nickel powder, nickel hydroxide, nickel oxide, soluble organic acid salts of nickel, basic carbonates of nickel, and carbonates of nickel. The soluble organic acid salts of nickel is not particularly limited herein as long as it can be mixed with the polybasic organic carboxylic acid in a solvent to form a homogeneous solution. The soluble organic acid salt may be a heteroatom-free organic carboxylate of nickel, such as nickel acetate and the like.

The polybasic organic carboxylic acid is not particularly limited herein, and may be a polybasic organic carboxylic acid comprising nitrogen or free of nitrogen, as long as it can be mixed with the nickel source in a solvent to form a homogeneous solution. For example, the polybasic organic carboxylic acid may be one or more selected from the group consisting of citric acid, maleic acid, trimesic acid, terephthalic acid, gluconic acid, malic acid, ethylenediaminetetraacetic acid (EDTA), pyridinedicarboxylic acid, iminodiacetic acid, diethylenetriaminepentaacetic acid, and 1,3-propanediaminetetraacetic acid. Preferably, the dipicolinic acid may be 2,3-dipicolinic acid, 2,4-dipicolinic acid, 2,5-dipicolinic acid, 2,6-dipicolinic acid, 3,4-dipicolinic acid or 3,5-dipicolinic acid.

In a preferred embodiment, the nitrogen-containing compound may be one or more selected from the group consisting of urea, melamine, dicyanodiamine, hexamethylenetetramine, and amino acids. It can be appreciated that when the polybasic organic carboxylic acid is a nitrogen-containing organic carboxylic acid (such as ethylenediaminetetraacetic acid, dipicolinic acid, iminodi acetic acid, diethylenetriaminepentaacetic acid, and 1,3-propylenediaminetetraacetic acid, etc.), the nanocomposite material having the nitrogen-doped graphitized carbon shell of the present application can be obtained without adding a nitrogen-containing compound as described above separately.

In some preferred embodiments, the nickel source is mixed in step i) with a polybasic organic carboxylic acid that is one or more selected from the group consisting of citric acid, maleic acid, trimesic acid, terephthalic acid, gluconic acid and malic acid in a solvent, and the mass ratio of the nickel source to the polybasic organic carboxylic acid is about 1:(0.1-100), preferably about 1:(0.1-10).

In some preferred embodiments, the nickel source is mixed in step i) with a polybasic organic carboxylic acid that is one or more selected from the group consisting of ethylenediaminetetraacetic acid, dipicolinic acid, iminodi acetic acid, diethylenetriaminepentaacetic acid, and 1,3-propanediaminetetraacetic acid in a solvent, and the mass ratio of the nickel source to the polybasic organic carboxylic acid is about 1:(0.1-10), preferably about 1:(0.5-5).

In some preferred embodiments, the nickel source, the polybasic organic carboxylic acid and the nitrogen-containing compound are mixed in step i) in a solvent, wherein the polybasic organic carboxylic acid is one or more selected from the group consisting of citric acid, maleic acid, trimesic acid, terephthalic acid, gluconic acid and malic acid, and the mass ratio of the nickel source, the polybasic organic carboxylic acid and the nitrogen-containing compound is about 1:(0.1-10):(0.1-10), preferably about 1:(0.5-5):(0.5-5), more preferably about 1:(0.8-2):(1-2), for example about 1:1:2, about 1:1:1, etc.

In a further preferred embodiment, in step i), in addition to the nickel source, the polybasic organic carboxylic acid and the nitrogen-containing compound, other organic compound(s) may be added to form a homogeneous solution, which may be any organic compound that can supplement the carbon source required in the product while being free of other doping atoms, and is preferably non-volatile organic compound, such as organic polyols, lactic acid, and the like. In a still further preferred embodiment, the mass ratio of the nickel source, the polybasic organic carboxylic acid and said other organic compound is about 1:(0.1-10):(0-10), preferably about 1:(0.5-5):(0-5), more preferably about 1:(0.8-3):(0-3).

In a preferred embodiment, the pyrolysis of step iii) comprises: heating the precursor in an inert or reducing atmosphere to a temperature of a constant-temperature stage, and keeping at the temperature of the constant-temperature stage for a period of time. Preferably, the rate of heating is about 0.5-30° C./min, preferably about 1-10° C./min; the temperature of the constant-temperature stage is about 400-800° C., and preferably 500-800° C.; the constant-temperature period is about 20-600 min, preferably about 60-480 min; the inert atmosphere is nitrogen or argon, and the reducing atmosphere is a mixed gas of an inert gas and hydrogen, for example, an inert atmosphere incorporated with a small amount of hydrogen.

Without being bound to any theory, the applicants believe that the product obtained after pyrolysis in step iii) is a nanocomposite material of nickel coated with a graphitized carbon layer, wherein the "graphitized carbon layer" has a layered, rather than amorphous, carbon structure, that can be clearly observed under high-resolution transmission electron microscopy. The nanocomposite material comprises nickel nanoparticles tightly coated with a layer of graphitized carbon, so that the nickel nanoparticles are substantially blocked from contacting the external environment. The tightness of the coating of the graphitized carbon layer on the nickel can be determined using a parameter "loss on acid washing". If the nickel is not tightly coated by the graphitized carbon layer, a loss of the nickel in the core may occur due to its dissolution in acid after an acid washing treatment. The larger the loss on acid washing, the lower the tightness of the coating of the graphitized carbon layer on the nickel, and the smaller the loss on acid washing, the higher the tightness of the coating of the graphitized carbon layer on the nickel.

According to the present application, the conditions of the acid washing treatment normally include: treating a sample with 20 mL of a sulfuric acid aqueous solution (1 mol/L) per 1 g of the sample for 8 hours at 90° C. After the treatment, the sample is washed to be neutral by deionized water, dried, weighed and analyzed, and then the loss on acid washing is calculated as follows:

Loss on acid washing=[1−(mass fraction of nickel in the composite material after acid washing×mass of the composite material after acid washing)÷(mass fraction of nickel in the composite material to be treated×mass of the composite material to be treated)]×100%.

It should be noted that the "composite material" mentioned in the above equation refers to the composite material that has been pyrolyzed in step iii) but has not been heat treated in step iv). In a preferred embodiment, the loss on acid washing of the nanocomposite material obtained after pyrolysis in step iii) is typically ≤40%, for example ≤30%, ≤20% or ≤10%.

In a preferred embodiment, the heat treatment of step iv) (also referred to herein as "oxygen treatment") comprises introducing an oxygen-containing gas to the pyrolyzed product and heating, wherein the oxygen-containing gas may have a concentration of oxygen by volume of about 10-40%, preferably about 10-20%, for example about 10%, about 12%, about 15%, about 17%, about 20%, etc. Preferably, the oxygen-containing gas comprises oxygen and a balance gas, wherein the balance gas may be an inert gas such as nitrogen or argon, preferably nitrogen, but is not limited thereto.

In a preferred embodiment, the temperature of the heat treatment of step iv) is about 200-500° C., preferably about 300-400° C.; the time of the heat treatment is about 0.5-10 hours, preferably about 1-10 hours, more preferably about 4-8 hours, such as about 4 hours, about 5 hours, about 5.5 hours, about 6 hours, about 7 hours, about 7.8 hours, etc.

As described above, the pyrolysis in step iii) of the method according to the present application results in a nanocomposite material with a graphitic carbon shell coated on an inner core of nickel, which has a carbon content of about 15-60 wt %, and comprises nickel nanoparticles that are tightly coated with a graphitized carbon layer and thus substantially blocked from contacting the external environment. It is well known to those skilled in the art that carbon will be oxidized to produce gas when contacting with oxygen at a high temperature, and therefore, after being subjected to the heat treatment of step iv), most carbon in the pyrolyzed product will be lost due to the oxidation reaction.

However, the inventors of the present application surprisingly found that, in the material obtained after the heat treatment, most of the carbon has been burned off and the nickel in the core has been oxidized, but a small part of carbon has been retained. As mentioned above, the detection and analysis using XPS and Raman spectrum have proven that the part of carbon retained is a thin film layer of graphitized carbon-coated on the surface of nickel oxide, and the thin film layer of carbon further provides the nanocomposite material with a plurality of excellent properties, especially catalytic activity. In addition, in the case where a nitrogen-containing polybasic organic carboxylic acid and/or a nitrogen-containing compound is used, a small amount of nitrogen will be further remained on the graphitized carbon film, and such nitrogen is beneficial to regulating and controlling the electrochemical property and the surface activity of the material.

In a third aspect, there is provided a carbon-coated nickel oxide nanocomposite material obtained by the method of the present application, which has the features as described in the first aspect of the present application, and the detailed description thereof is omitted herein for brevity.

In a fourth aspect, there is provided the use of a nanocomposite material according to the present application as a catalyst. The nanocomposite material according to the present application has a catalytic activity and can be used as a catalyst in various reactions in industrial production. For example, when the nanocomposite material is used as a catalyst, the nanocomposite material can be effectively used for catalytic decomposition of nitrous oxide and catalytic combustion of volatile organic compounds, and has good industrial application prospects.

In a fifth aspect, the present application provides a method for catalyzing the decomposition of nitrous oxide, comprising contacting nitrous oxide with a catalyst for catalytic decomposition to produce nitrogen and oxygen, wherein the catalyst comprises a nanocomposite material according to the present application as an active component, and preferably the nanocomposite material according to the present application is used as the catalyst.

In a particular embodiment, the method comprises passing a gas comprising nitrous oxide into a reactor loaded with the catalyst for catalytic decomposition.

In a preferred embodiment, the conditions of the catalytic decomposition include: a temperature of about 300-400° C., preferably about 350-380° C.; a reaction space velocity of about 1000-3000 ml of reaction gas/(hr·g of catalyst). The present application allows a high reaction space velocity, which indicates that the nanocomposite material according to the present application has a high activity when applied to the reaction and thus a high processing capacity of plant can be obtained.

According to the present application, as described above, the catalysts for decomposition of $N_2O$ currently studied and reported are mainly noble metal catalysts, ion-exchanged molecular sieve catalysts, and transition metal oxide catalysts. Although noble metal catalysts have a low decomposition temperature, they are expensive and thus not suitable for large-scale industrial production; the temperature for efficient decomposition of other molecular sieve catalysts and transition metal oxide catalysts is 450-550° C., and the high temperature required by the reaction greatly increases the industrial cost; in addition, because the decomposition of nitrous oxide generates oxygen, the catalyst is easy to be deactivated; moreover, the agglomeration of metal active centers at high temperatures also affects the catalytic performance of these catalysts more easily.

However, the inventors of the present application found that, when used as a catalyst, the carbon-coated nickel oxide nanocomposite material of the present application can effectively decompose nitrous oxide into nitrogen and oxygen, and exhibits excellent catalytic activity stability in the reaction. In addition, when existing catalysts are used for catalyzing the decomposition of nitrous oxide, high-concentration nitrous oxide obtained in industrial production is typically required to be diluted to a concentration of about 0.5-2%, while the nanocomposite material according to the present application can be used for direct decomposition to achieve a high decomposition rate without a dilution operation. For example, when the concentration of nitrous oxide by volume in the reaction gas is about 5-40%, for example, about 30-40%, the catalytic decomposition can be performed directly with a decomposition rate of 99% or more, so that the industrial cost can be greatly reduced, and the method has a good industrial application prospect.

In a sixth aspect, the present application provides a method for treating volatile organic compounds, comprising contacting a volatile organic compound with a catalyst for oxidation reaction, wherein the catalyst comprises a nanocomposite material according to the present application as an active component, and preferably a nanocomposite material according to the present application is used as the catalyst.

In a preferred embodiment, the volatile organic compound is one or more selected from the group consisting of $C_1$-$C_4$ hydrocarbon compounds, and may be, for example, n-butane, n-propane, ethane, and/or methane.

In a preferred embodiment, the oxidation reaction is carried out by bringing a mixed gas containing the volatile organic compound and oxygen into contact with the catalyst for catalytic combustion. Preferably, in the mixed gas, the volatile organic compound may be present in a volume percent of about 0.01-2%, such as about 0.01%, about 0.05%, about 0.09%, about 0.1%, about 0.15%, about 0.18%, about 0.2%, etc.; and the oxygen may be present in a volume percent of about 5-20%, such as about 5%, about 10%, about 15%, about 18%, about 20%, etc. In some further preferred embodiments, the mixed gas may further contain an inert gas such as nitrogen or argon.

In a preferred embodiment, the space velocity for the oxidation reaction is about 1000-5000 ml of reaction gas/ (hr·g of catalyst). The present application allows a high reaction space velocity, indicating that the nanocomposite material according to the present application has a high activity when applied to the reaction, and thus a high processing capacity of plant can be obtained.

In a preferred embodiment, the temperature of the oxidation reaction is about 300-450° C., preferably about 350-400° C. This indicates that the catalytic oxidation reaction can be well performed at low temperatures using the nanocomposite material of the present application.

According to the present invention, as described above, industrial waste gas often contains Volatile Organic Compounds (VOCs), which have been one of the main causes of photochemical smog, and is considered together with nitrogen oxides, inhalable particles, etc. as important pollutants to be controlled for atmospheric quality. In addition, they have high toxicity, carcinogenic hazards, etc., so that catalytic oxidation materials with excellent performance are urgently needed for the treatment of VOCs. When used for catalytic combustion of volatile organic compounds, the nanocomposite material according to the present application shows excellent catalytic activity and stability, can catalyze the oxidation combustion of VOCs at low temperatures with high efficiency, and thus is beneficial to solving the problem in purification of VOCs, and has important significance for reducing air pollution.

In preferred embodiments, the present application provides the following technical solutions:

A1. A carbon-coated nickel oxide nanocomposite material, having a core-shell structure including an outer graphitized carbon shell and an inner core comprising nickel oxide nanoparticle(s), wherein the nanocomposite material has a carbon content of no more than 5 wt %.

A2. The nanocomposite material of Item A1, wherein the nanocomposite material has a carbon content of no more than 1 wt %.

A3. The nanocomposite material of Item A1, wherein the nanocomposite material has a ratio of the carbon element mass content determined by X-ray photoelectron spectroscopy to the carbon element mass content determined by elemental analysis of not less than 10.

A4. The nanocomposite material of Item A1, wherein the nanocomposite material has a Raman spectrum in which the ratio of the intensity of the G peak near 1580 $cm^{-1}$ to the intensity of the D peak near 1320 $cm^{-1}$ of greater than 2.

A5. The nanocomposite material of Item A1, wherein the core-shell structure has a particle size of 1-100 nm.

A6. The method for preparing a carbon-coated nickel oxide nanocomposite material of any of Items A1-A5, comprising the steps of:

adding a nickel source and a polybasic organic carboxylic acid into a solvent for mixing to form a homogeneous solution;

removing the solvent in the homogeneous solution to obtain a precursor;

pyrolyzing the precursor in an inert or reducing atmosphere; and carrying out an oxygen treatment on the pyrolyzed product to obtain the nanocomposite material.

A7. The method of Item A6, wherein the oxygen treatment comprises introducing an oxygen-containing gas into the pyrolyzed product and heating, wherein the oxygen-containing gas contains oxygen and a balance gas, and the oxygen is present in a volume concentration of 10% to 40%.

A8. The method of Item A6, wherein the temperature of the oxygen treatment is 200-500° C., and the time of the oxygen treatment is 0.5-10 h.

A9. The method of Item A6, wherein the mass ratio of the nickel source to the polybasic organic carboxylic acid is 1:(0.1-100); the nickel source is one or more selected from the group consisting of organic acid salts of nickel, nickel carbonate, basic nickel carbonate, nickel hydroxide and nickel oxide; the polybasic organic carboxylic acid is one or more selected from the group consisting of citric acid, maleic acid, trimesic acid, terephthalic acid, gluconic acid and malic acid.

A10. The method of Item A6, wherein the pyrolyzing comprises: heating the precursor in an inert or reducing atmosphere to a temperature of a constant-temperature stage, and keeping at the temperature of the constant-temperature stage;

wherein the rate of heating is 0.5-30° C./min, the temperature of the constant-temperature stage is 400-800° C., the constant-temperature period is 20-600 min, the inert atmosphere is nitrogen or argon, and the reducing atmosphere is a mixed gas of inert gas and hydrogen.

A11. Use of the nanocomposite material of any of Items A1-A5 as a catalyst.

A12. Use of the nanocomposite material of any of Items A1-A5 as a catalyst for decomposing nitrous oxide, comprising: contacting the catalyst with nitrous oxide for catalytic decomposition to produce nitrogen and oxygen.

A13. Use of Item A12, wherein the temperature of the catalytic decomposition is 300-400° C.

A14. Use of Item A12, wherein the space velocity of the catalytic decomposition is 1000-3000 ml of reaction gas/(hr·g of catalyst).

A15. Use of Item A12, wherein the nitrous oxide is present in a concentration by volume of 30-40%.

B1. A method for catalytically combusting volatile organic compounds, comprising: catalyzing the oxidation reaction of a volatile organic compound by using a carbon-coated nickel oxide nanocomposite material as a catalyst;

wherein the nanocomposite material has a core-shell structure including an outer graphitized carbon shell and an inner core comprising nickel oxide nanoparticle(s), wherein the nanocomposite material has a carbon content of not more than 5 wt %.

B2. The method of Item B1, wherein the oxidation reaction comprising contacting a mixed gas containing the volatile organic compound and a standard gas containing oxygen with the catalyst for catalytic combustion.

B3. The method of Item B2, wherein the mixed gas contains 0.01-2% by volume of the volatile organic compound and 5-20% by volume of oxygen.

B4. The method of Item B1, wherein the volatile organic compound is one or more selected from the group consisting of hydrocarbon compounds having 1 to 4 carbon atoms.

B5. The method of Item B1, wherein the space velocity of the oxidation reaction is 1000-5000 ml of reaction gas/(hr·g of catalyst).

B6. The method of Item B1, wherein the temperature of the oxidation reaction is 300-450° C.

B7. The method of Item B1, wherein the nanocomposite material has a carbon content of not more than 1 wt %.

B8. The method of Item B1, wherein the nanocomposite material has a ratio of the carbon content determined by X-ray photoelectron spectroscopy to the carbon content determined by elemental analysis of not less than 10.

B9. The method of Item B1, wherein the nanocomposite material has a Raman spectrum in which a ratio of the intensity of the G peak near 1580 $cm^{-1}$ to the intensity of the D peak near 1320 $cm^{-1}$ is greater than 2.

B10. The method of Item B1, wherein the core-shell structure has a particle size of 1-100 nm.

C1. A carbon-coated nickel oxide nanocomposite material, having a core-shell structure including an outer shell of a nitrogen-doped graphitized carbon film and an inner core comprising nickel oxide nanoparticle(s), wherein the nanocomposite material has a carbon content of not more than 5 wt %.

C2. The nanocomposite material of Item C1, wherein the nanocomposite material has a carbon content of no greater than 1 wt %.

C3. The nanocomposite material of Item C1, wherein the nanocomposite material has a nitrogen element content of 0.1 to 5 mol % as determined by X-ray photoelectron spectroscopy.

C4. The nanocomposite material of Item C1, wherein the nanocomposite material has a ratio of the carbon element mass content determined by X-ray photoelectron spectroscopy to the carbon element mass content determined by elemental analysis of not less than 10.

C5. The nanocomposite material of Item C1, wherein the nanocomposite material has a Raman spectrum in which a ratio of the intensity of the G peak near 1580 $cm^{-1}$ to the intensity of the D peak near 1320 $cm^{-1}$ is greater than 2.

C6. The nanocomposite material of Item C1, wherein the core-shell structure has a particle size of 1-100 nm.

C7. The method for preparing a carbon-coated nickel oxide nanocomposite material of any of Items C1-C6, comprising the steps of:

adding a nickel source and a carboxylic acid into a solvent for mixing to form a homogeneous solution;

removing the solvent in the homogeneous solution to obtain a precursor;

pyrolyzing the precursor in an inert or reducing atmosphere; and carrying out oxygen treatment on the pyrolyzed product to obtain the nanocomposite material;

wherein the carboxylic acid is a mixture of a polybasic organic carboxylic acid and a nitrogen-containing compound or a nitrogen-containing organic carboxylic acid.

C8. The method of Item C7, further comprising conducting an acid washing treatment on the pyrolyzed product before the oxygen treatment.

C9. The method of Item C8, wherein the loss on acid washing of the product after the acid washing treatment is ≤40%.

C10. The method of Item C7, wherein the oxygen treatment comprises introducing the standard gas into the pyrolyzed product and heating, wherein the standard gas contains oxygen and a balance gas, and the oxygen is present in a volume concentration of 10% to 40%.

C11. The method of Item C7, wherein the temperature of the oxygen treatment is 200-500° C., and the time of the oxygen treatment is 0.5-10 h.

C12. The method of Item C7, wherein when the carboxylic acid is a mixture of a polybasic organic carboxylic acid and a nitrogen-containing compound, the mass ratio of the nickel source, the polybasic organic carboxylic acid, and the nitrogen-containing compound is 1:(0.1-10):(0.1-10); when the carboxylic acid is a nitrogen-containing organic carboxylic acid, the mass ratio of the nickel source to the nitrogen-containing organic carboxylic acid is 1:(0.1-10).

C13. The method of Item C7, wherein the nickel source is one or more selected from the group consisting of nickel powder, nickel hydroxide, nickel oxide, soluble organic acid salts of nickel, basic carbonates of nickel and carbonates of nickel, and the polybasic organic carboxylic acid is one or more selected from the group consisting of citric acid, maleic acid, trimesic acid, terephthalic acid, gluconic acid, malic acid, ethylenediaminetetraacetic acid, dipicolinic acid, iminodiacetic acid, diethylenetriaminepentaacetic acid and 1,3-propanediaminetetraacetic acid; the nitrogen-containing compound is one or more selected from the group consisting of urea, melamine, dicyanodiamine, hexamethylenetetramine and amino acid.

C14. The method of Item C7, wherein the pyrolyzing comprises: heating the precursor in an inert or reducing atmosphere to a temperature of a constant-temperature stage, and keeping at the temperature of the constant-temperature stage;

wherein the rate of heating is 0.5-30° C./min, the temperature of the constant-temperature stage is 400-800° C., the constant-temperature period is 20-600 min, the inert atmosphere is nitrogen or argon, and the reducing atmosphere is a mixed gas of inert gas and hydrogen.

C15. Use of the nanocomposite material of any of Items C1-C6 as an active component of a catalyst in catalyzing a chemical reaction.

C16. A method for catalyzing the decomposition of nitrous oxide, comprising contacting nitrous oxide with a catalyst for catalytic decomposition to produce nitrogen and oxygen, wherein the catalyst comprises the nanocomposite material of any of Items C1-C6.

C17. The method of Item C16, wherein in the catalytic decomposition, the reaction temperature is 300-400° C., the reaction space velocity is 1000-3000 ml of reaction gas/(hr·g of catalyst), and the volume concentration of the nitrous oxide is 30-40%.

D1. A method for catalytically combusting volatile organic compounds, comprising: catalyzing an oxidation reaction of a volatile organic compound by using a catalyst comprising a carbon-coated nickel oxide nanocomposite material;

wherein the nanocomposite material has a core-shell structure including an outer shell that is a nitrogen-doped graphitized carbon film and an inner core comprising nickel oxide nanoparticle(s), wherein the nanocomposite material has a carbon content of not more than 5 wt %.

D2. The method of Item D1, wherein the oxidation reaction comprises: contacting a mixed gas containing the volatile organic compound and oxygen with the catalyst for catalytic combustion.

D3. The method of Item D2, wherein the mixed gas contains 0.01-2% by volume of the volatile organic compound and 5-20% by volume of oxygen.

D4. The method of Item D1, wherein the volatile organic compound is one or more selected from the group consisting of C1-C4 hydrocarbon compounds.

D5. The method of Item D1, wherein the space velocity of the oxidation reaction is 1000-5000 ml of reaction gas/(hr·g of catalyst).

D6. The method of Item D1, wherein the temperature of the oxidation reaction is 300-450° C.

D7. The method of Item D1, wherein the nanocomposite material has a carbon content of not greater than 1 wt %.

D8. The nanocomposite material of Item D1, wherein the nanocomposite material has a nitrogen element content of 0.1 to 5 mol % as determined by X-ray photoelectron spectroscopy.

D9. The nanocomposite material of Item D1, wherein the nanocomposite material has a ratio of the carbon element mass content determined by X-ray photoelectron spectroscopy to the carbon mass element content determined by elemental analysis of not less than 10.

D10. The nanocomposite material of Item D1, wherein the nanocomposite material has a Raman spectrum in which a ratio of the intensity of the G peak near 1580 $cm^{-1}$ to the intensity of the D peak near 1320 $cm^{-1}$ is greater than 2.

D11. The nanocomposite material of Item D1, wherein the core-shell structure has a particle size of 1-100 nm.

EXAMPLES

The present application will be further illustrated with reference to the following examples, but the present application is not limited thereto.

Unless otherwise stated, the reagents used in the examples and comparative examples of the present application have an analytical purity.

In the present application, the elements on the material surface are detected using an X-ray photoelectron spectrum analyzer (XPS). The X-ray photoelectron spectrum analyzer is ESCALab220i-XL X-ray photoelectron analyzer provided with Advantage V5.926 software and manufactured by VG Scientific Company, and the analysis and test conditions of the X-ray photoelectron spectrum analyzer include: an excitation source of monochromatized AlKa X-ray with a power of 330 W and a base vacuum for analysis and test of $3\times10^{-9}$ mbar.

The analysis of carbon (C) element is carried out on an Elementar Micro Cube elemental analyzer which is mainly used for analyzing four elements of carbon (C), hydrogen (H), oxygen (O) and nitrogen (N), and the operation and conditions are as follows: weighing 1-2 mg of a sample in a tin cup, placing the sample in an automatic sample introducing disc, passing the sample into a combustion tube through a ball valve for combustion at a combustion temperature of 1000° C. (a helium gas purging is performed to eliminate atmospheric interference during sample introducing), and then reducing the combusted gas using a reduced copper to form nitrogen, carbon dioxide and water. The mixed gas is separated by three desorption columns and sequentially passed to a TCD detector for detection. The oxygen element is analyzed by converting oxygen in the sample into CO under the action of a carbon catalyst through pyrolysis, and then detecting the CO by TCD. Since the composite material of the present invention comprises only carbon, nitrogen, and metal oxide, the total content of the metal oxide can be known from the content of carbon and nitrogen element.

The ratio of between different metal oxides is measured by an X-ray fluorescence spectrometer (XRF), and the content of different metal oxides in the composite material is calculated based on the content of carbon element. The X-ray fluorescence spectrum analyzer (XRF) used in the present application is Rigaku 3013 X-ray fluorescence spectrum analyzer, and the analysis and test conditions for the X-ray fluorescence spectrum include: a scanning time of 100 s and an atmosphere of air.

The Raman detection of the present application is performed using LabRAM HR UV-NIR Laser Confocal Raman spectrometer manufactured by HORIBA Company of Japan, and the laser wavelength is 325 nm.

The high-resolution transmission electron microscope (HRTEM) used in the present application is JEM-2100 (HRTEM) available from Japan electronics corporation, and the test conditions for the high-resolution transmission electron microscope include: an acceleration voltage of 200 kV.

The XRD diffractometer used in the present application is XRD-6000 X-ray powder diffractometer available from Shimadzu, Japan, and the test conditions for XRD include: Cu target, Kα ray (with a wavelength λ=0.154 nm), a tube voltage of 40 kV, a tube current of 200 mA, and a scanning speed 10° (2θ)/min.

Example I-1

This example is provided to illustrate the preparation of a carbon-coated nickel oxide nanocomposite material according to the present application.

(1) 10 g of nickel carbonate and 10 g of citric acid were weighed and added into a beaker containing 100 mL of deionized water, stirred at 70° C. to obtain a homogeneous solution, and further heated till the solution was evaporated to dryness to obtain a solid precursor.

(2) The solid precursor obtained in the step (1) was placed in a porcelain boat, then the porcelain boat was placed in a constant-temperature zone of a tube furnace, nitrogen was introduced at a flow rate of 100 mL/min, heated to 600° C. at a rate of 4° C./min, kept at the temperature for 2 h and then the heating was stopped, and the resultant was cooled to room temperature under the nitrogen atmosphere to obtain a black solid. The loss on acid washing of the black solid was 36.7% as measured and calculated by the method described above.

(3) The black solid obtained in the step (2) was placed in a porcelain boat, then the porcelain boat was placed in a constant-temperature zone of a tube furnace, an oxygen-containing gas (comprising 15% of oxygen and a balance gas of nitrogen) was introduced at a flow rate of 100 mL/min, heated to 350° C. at a rate of 2° C./min, kept at the temperature for 8 hours and then the heating was stopped, and the resultant was cooled to room temperature under the atmosphere of the oxygen-containing gas to obtain a black solid, namely the nanocomposite material of the present application.

Material Characterization:

FIG. 1 shows an X-ray diffraction pattern (XRD) of the nanocomposite material of Example I-1, from which it can be seen that nickel in the nanocomposite material is present in the form of an oxide after the mild oxidation treatment.

Figure 2:
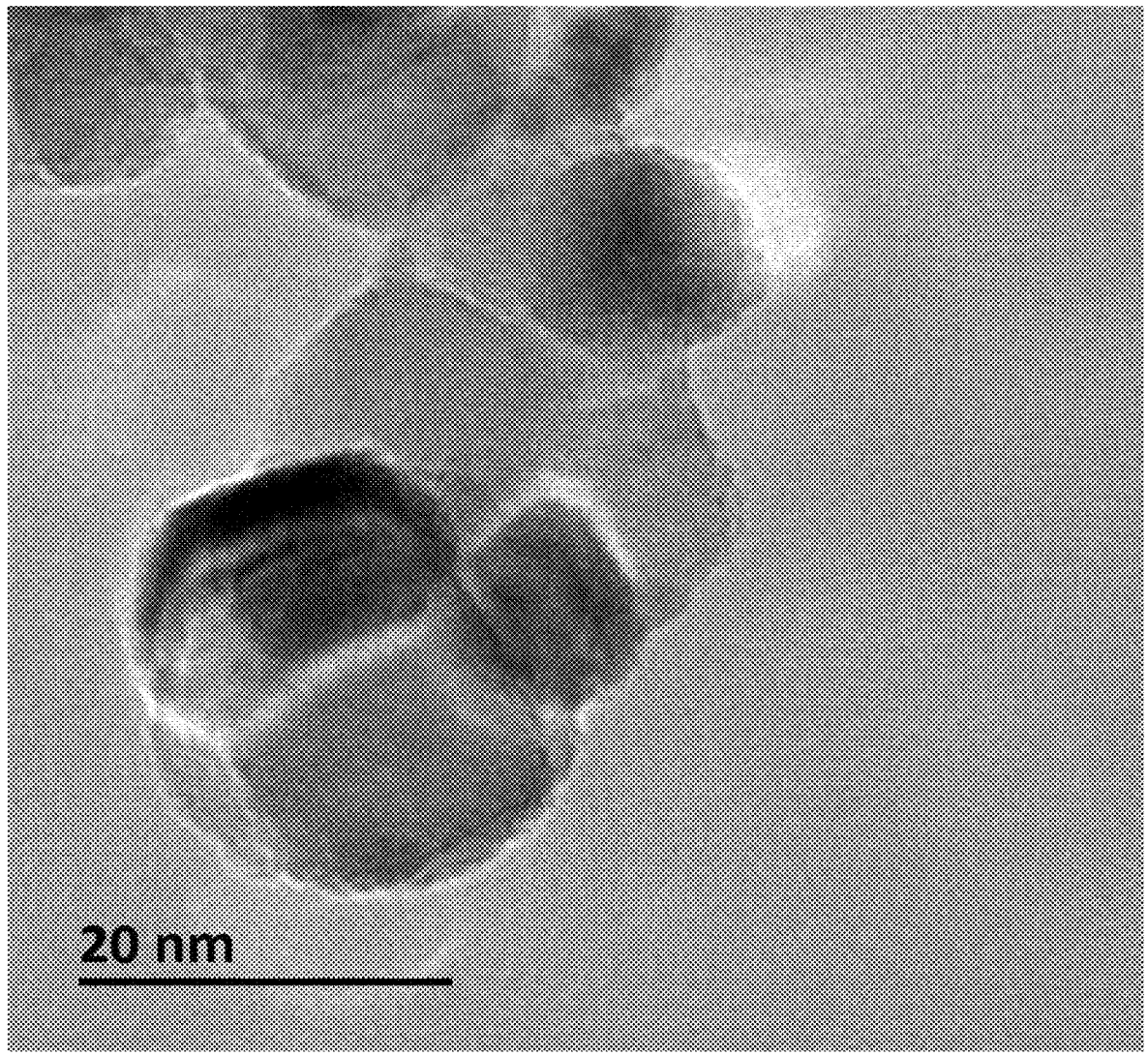
FIG. 2 shows a transmission electron micrograph of the nanocomposite material obtained in Example I-1.

FIG. 2 shows a transmission electron microscope (TEM) image of the nanocomposite material of Example I-1, in which it can be observed that the surface of the material has a layer of carbon film and a particle size of about 5 to 20 nm.

The nanocomposite material had a carbon content of 0.64 wt % and a nickel oxide content of 99.36 wt %, as determined by X-ray fluorescence spectroscopy (XRF) and elemental analysis.

In the elements on the surface layer of the nanocomposite material, carbon, oxygen and nickel are detected through X-ray photoelectron spectroscopy (XPS) analysis, wherein the ratio of the carbon element mass content in the surface layer to the total carbon element mass content is 32.7/1, indicating that the carbon in the material is mainly present on the surface of the particles.

Figure 3:
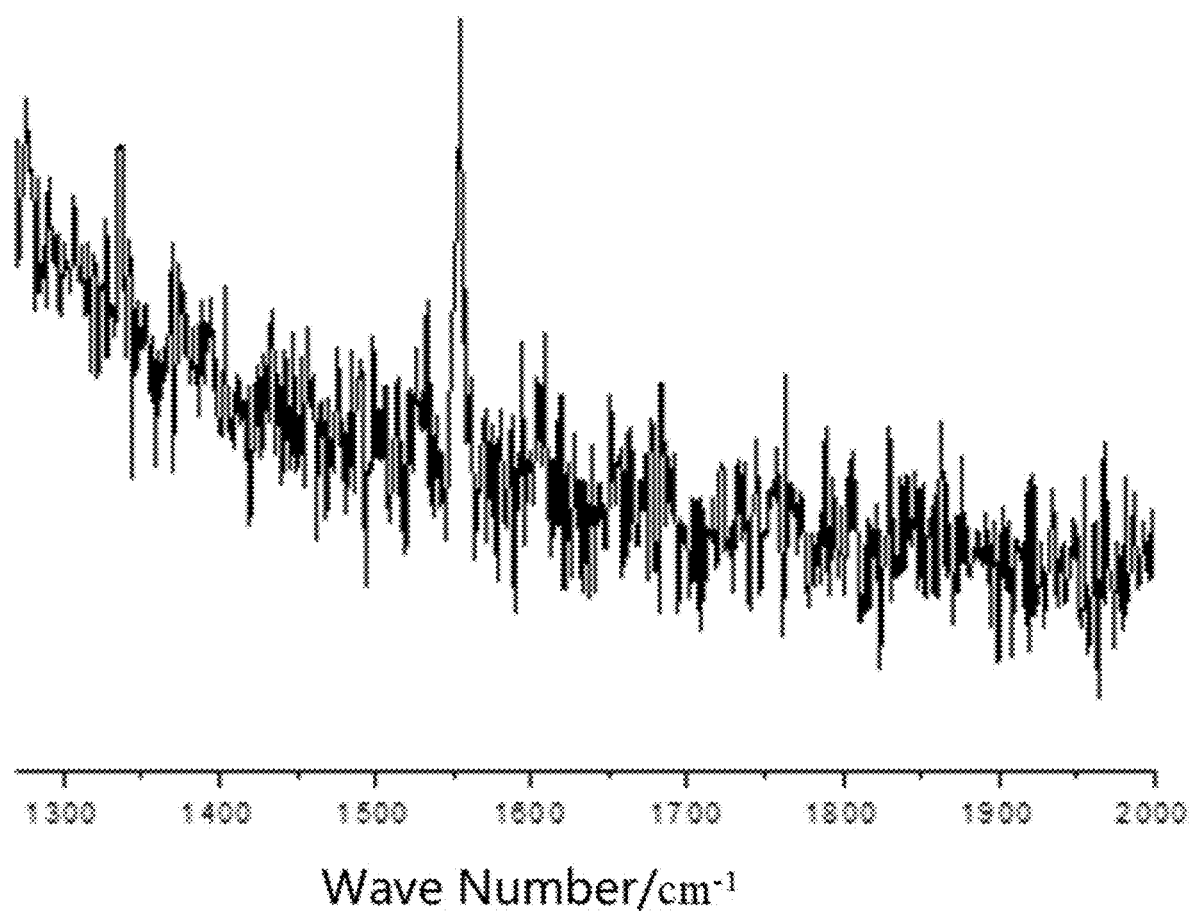
FIG. 3 shows a Raman spectrum of the nanocomposite material obtained in Example I-1.

FIG. 3 shows a Raman spectrum of the nanocomposite material, wherein the ratio of the intensity of the G peak (1580 $cm^{-1}$) to the intensity of the D peak (1320 $cm^{-1}$) is 2.2/1, indicating that the carbon in the material is mostly graphitic carbon.

Example I-2

This example is provided to illustrate the preparation of a carbon-coated nickel oxide nanocomposite material according to the present application.

(1) 10 g of nickel acetate and 10 g of citric acid were weighed and added into a beaker containing 100 mL of deionized water, stirred at 70° C. to obtain a homogeneous solution, and further heated till the solution was evaporated to dryness to obtain a solid precursor.

(2) The solid precursor obtained in the step (1) was placed in a porcelain boat, then the porcelain boat was placed in a constant-temperature zone of a tube furnace, nitrogen was introduced at a flow rate of 100 mL/min, heated to 650° C. at a rate of 2° C./min, kept at the temperature for 2 h and then the heating was stopped, and the resultant was cooled to room temperature under the nitrogen atmosphere to obtain a black solid. The loss on acid washing of the black solid was 31.9% as measured and calculated by the method described above.

(3) The black solid obtained in the step (2) was placed in a porcelain boat, then the porcelain boat was placed in a constant-temperature zone of a tube furnace, an oxygen-containing gas (comprising 15% of oxygen and a balance gas of nitrogen) was introduced at a flow rate of 100 mL/min, heated to 330° C. at a rate of 2° C./min, kept at the temperature for 8 hours and then the heating was stopped, and the resultant was cooled to room temperature under the atmosphere of the oxygen-containing gas to obtain a black solid, namely the nanocomposite material of the present application.

Figure 4:
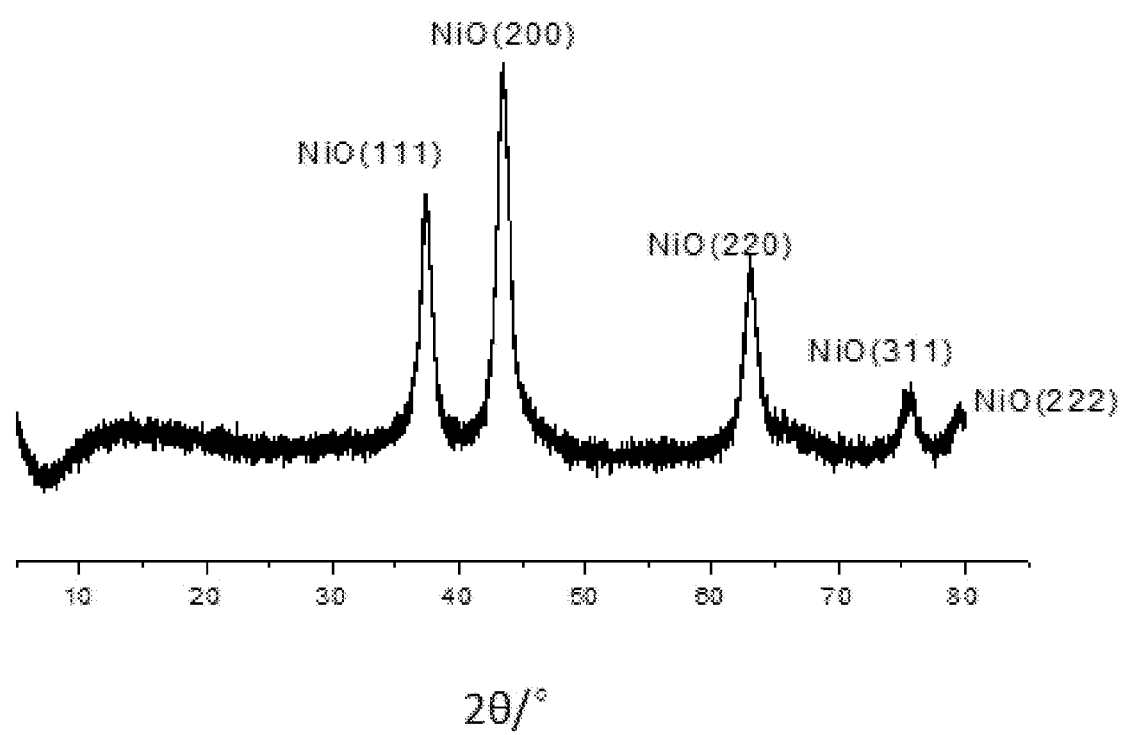
FIG. 4 shows an X-ray diffraction pattern of the nanocomposite material obtained in Example I-2.

Material Characterization:

FIG. 4 shows the X-ray diffraction pattern of the nanocomposite material of Example I-2, from which it can be seen that nickel in the nanocomposite material is present in the form of an oxide after the mild oxidation treatment.

Figure 5:
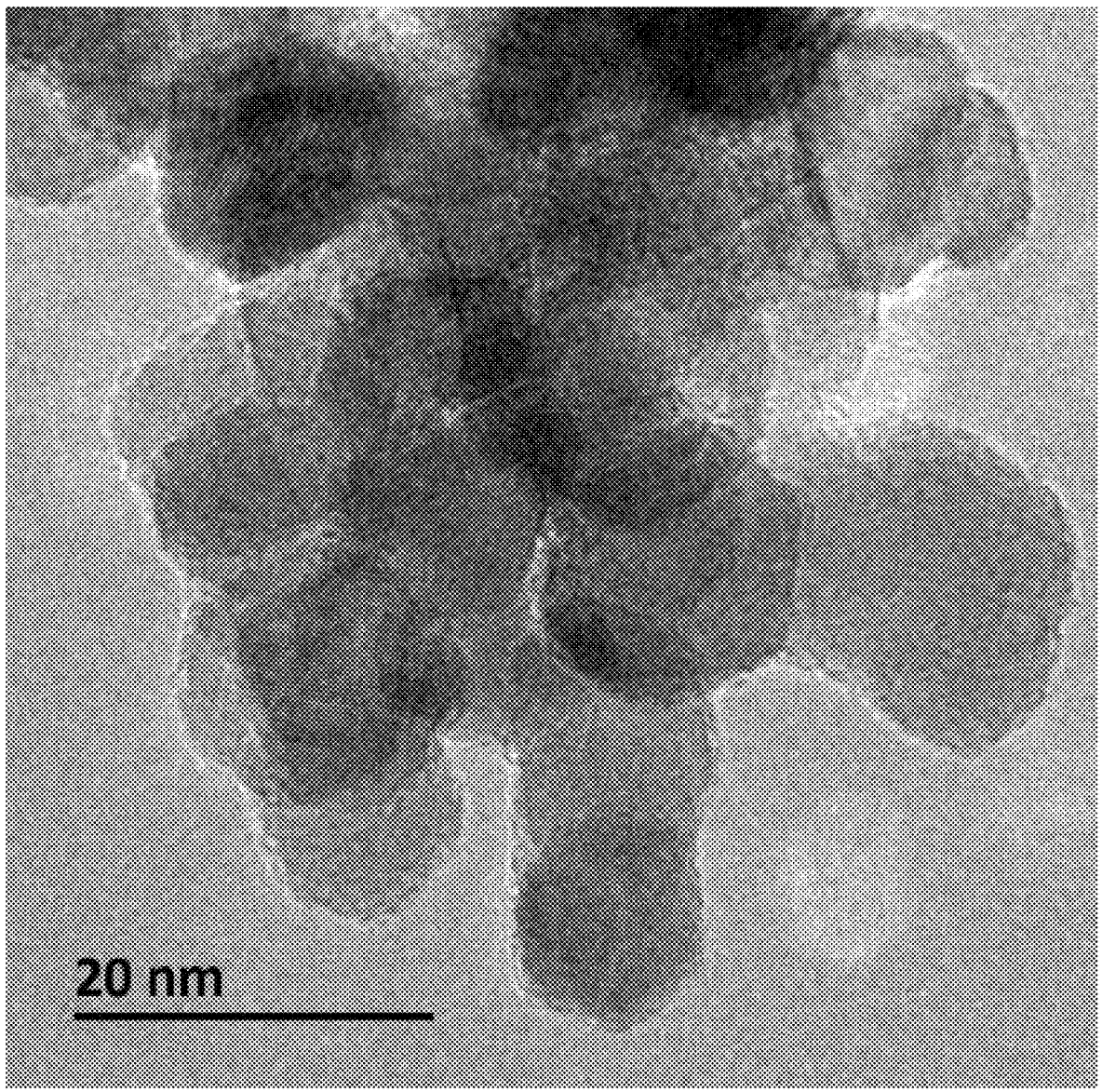
FIG. 5 shows a transmission electron micrograph of the nanocomposite material obtained in Example I-2.

FIG. 5 shows a transmission electron microscope image of the nanocomposite material of Example I-2, in which it can be observed that the surface of the material has a layer of carbon film and a particle size of about 5 to 20 nm.

The nanocomposite material has a carbon content of 0.91 wt % and a nickel oxide content of 99.09 wt %, as determined by X-ray fluorescence spectroscopy (XRF) and elemental analysis.

In the elements on the surface layer of the nanocomposite material, carbon, oxygen and nickel are detected through X-ray photoelectron spectroscopy (XPS) analysis, wherein the ratio of the carbon element mass content in the surface layer to the total carbon element mass content is 22.4/1, indicating that the carbon in the material is mainly present on the surface of the particles.

Figure 6:
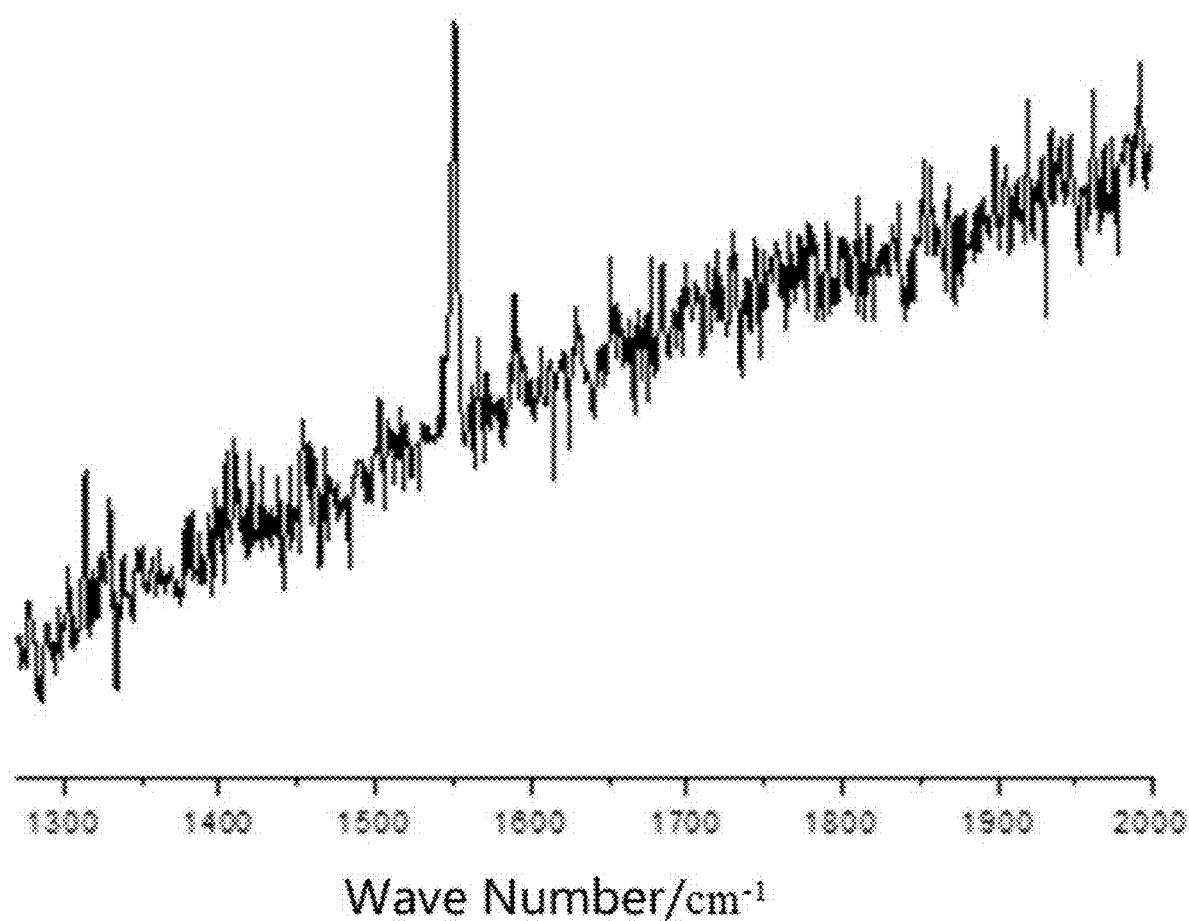
FIG. 6 shows a Raman spectrum of the nanocomposite material obtained in Example I-2.

FIG. 6 shows a Raman spectrum of the nanocomposite material, wherein the ratio of the intensity of the G peak (1580 $cm^{-1}$) to the intensity of the D peak (1320 $cm^{-1}$) is 2.4/1, indicating that the carbon in the material is mostly graphitic carbon.

Comparative Example I-1

10 g of nickel acetate solid was placed in a porcelain boat, then the porcelain boat was placed in a constant-temperature zone of a tube furnace, air was introduced at a flow rate of 150 mL/min, heated to 500° C. at a rate of 2° C./min, kept at the temperature for 2 h and then the heating was stopped, and the resultant was cooled to room temperature in an air atmosphere to obtain a sample material.

Figure 7:
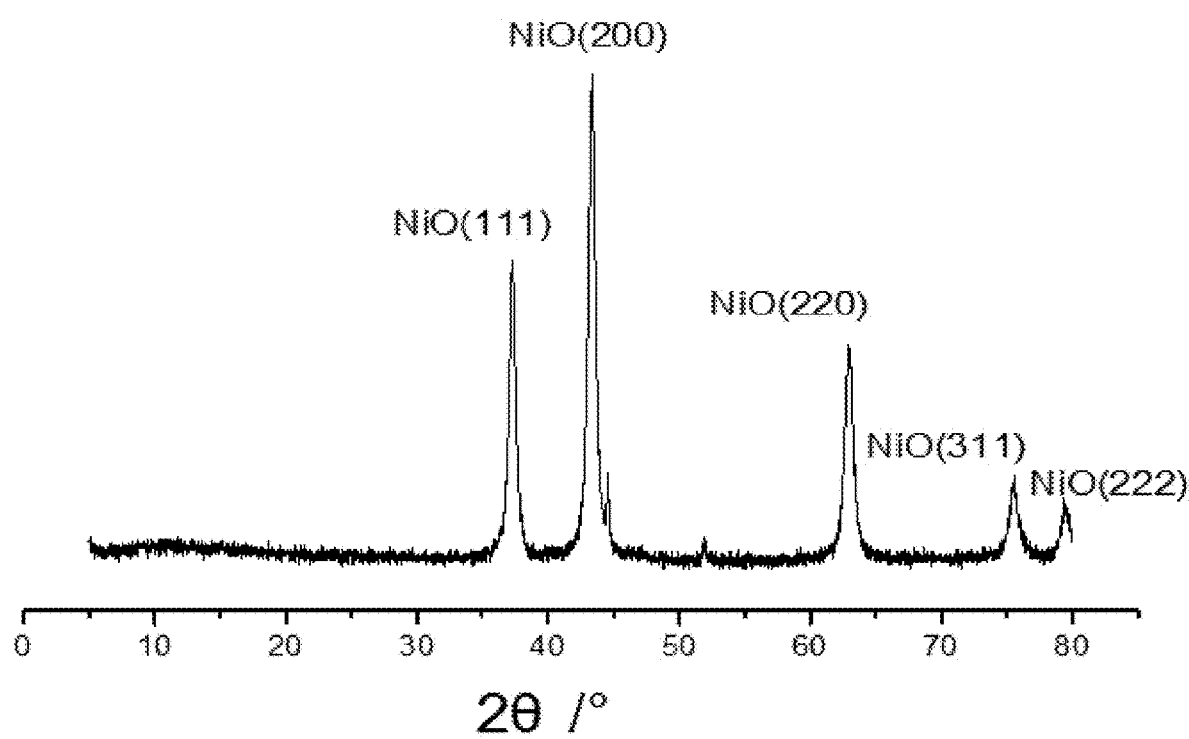
FIG. 7 shows an X-ray diffraction pattern of the material obtained in Comparative Example I-1.

FIG. 7 shows an X-ray diffraction pattern of the material obtained in Comparative Example I-1, from which it can be seen that the XRD pattern of the material shows characteristic peaks of nickel oxide, indicating that nickel is mainly present in the form of nickel oxide.

Figure 8A:
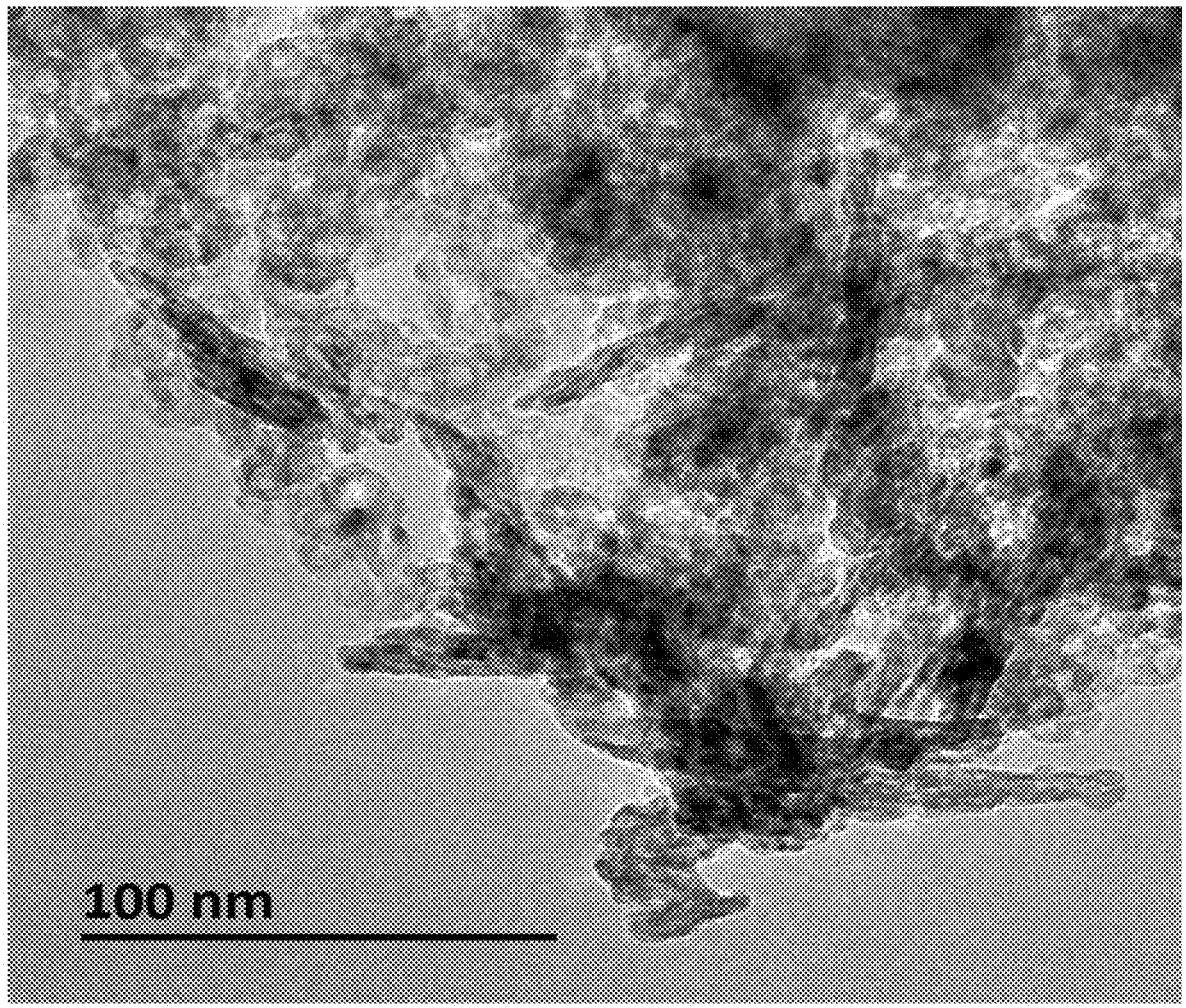
FIGS. 8a and 8b show TEM images of the material obtained in Comparative Example I-1 at different magnifications, respectively.
Figure 8B:
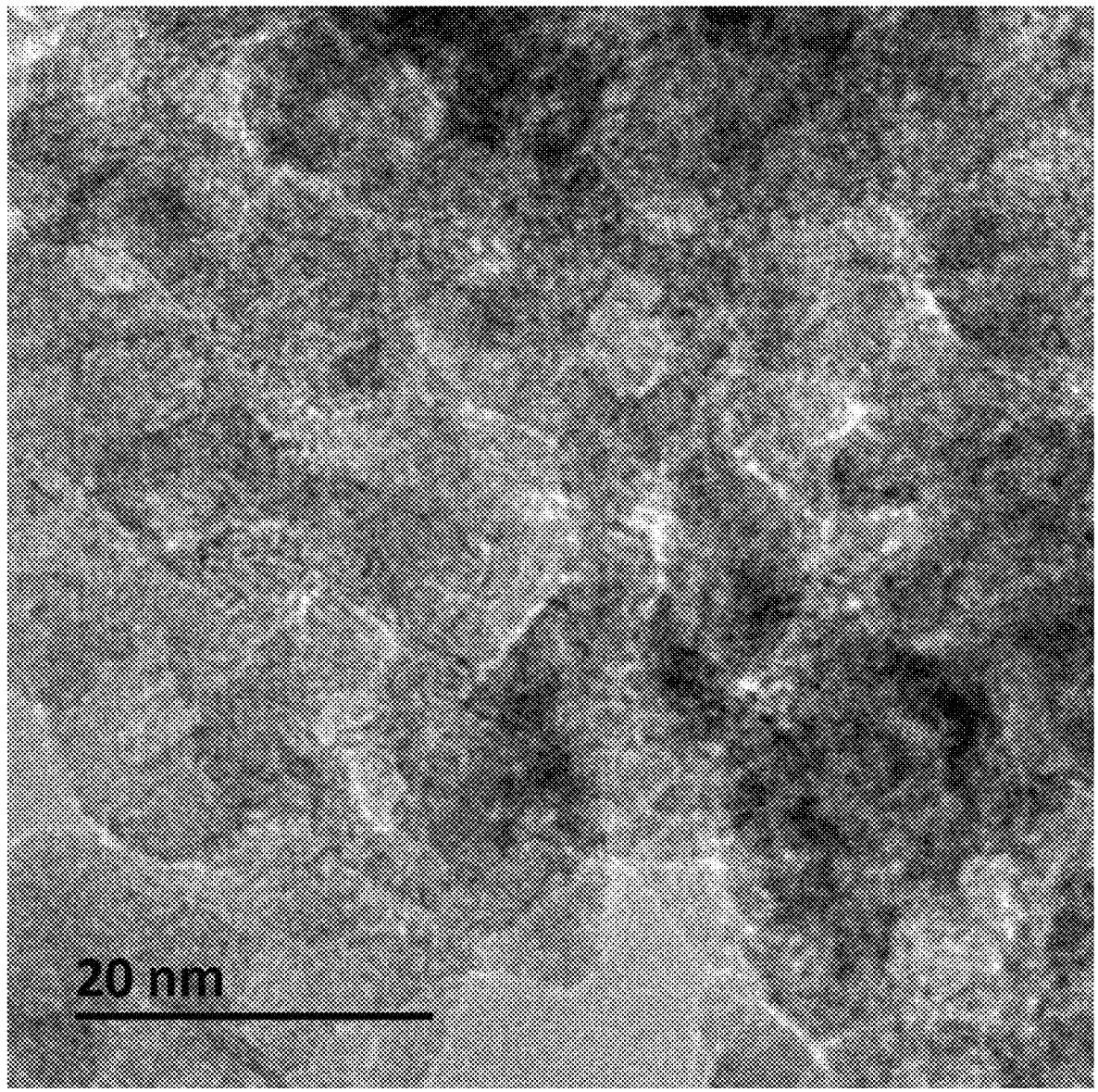

FIGS. 8a and 8b show TEM images of the material obtained in Comparative Example I-1 at different magnifications, respectively, in which it can be observed that nickel oxide is highly agglomerated, indicating that nickel oxide nanoparticles not coated with a carbon film are very susceptible to agglomeration.

The material obtained in Comparative Example I-1 had a carbon content of 0.12 wt % and a nickel oxide content of 99.88 wt %, as determined by XRF and elemental analysis.

Application Example I-1

This application example is provided to illustrate the use of the nanocomposite material of Example I-1 as a catalyst for catalyzing the decomposition of nitrous oxide.

0.5 g of the catalyst was placed in a continuous flow fixed bed reactor, and a mixed gas comprising 38.0% by volume of $N_2O$ and a balance gas of nitrogen was introduced at a flow rate of 15 ml/min. The activity was evaluated at a temperature of 300-500° C., and the conversion of $N_2O$ for the decomposition catalyzed by the catalyst at different temperatures is shown in Table I-1.

Application Example I-2

$N_2O$ decomposition was carried out as described in Application Example I-1, except that the nanocomposite material of Example I-2 was used as the catalyst, and the results are shown in Table I-1.

Comparative Application Example I-1

$N_2O$ decomposition was carried out as described in Application Example I-1, except that the material of Comparative Example I-1 was used as the catalyst and the results are shown in Table I-1.

Comparative Application Example I-2

$N_2O$ decomposition was carried out as described in Application Example I-1, except that commercially available nickel oxide (NiO) (analytically pure, batch No.: 20160803, manufacturer: Sinopharm Chemical Reagent Company Limited) was used as the catalyst and the results are shown in Table I-1.

TABLE I-1

Results for Application Examples I-1 and I-2 and Comparative Application Examples I-1 and I-2

| | | Conversion of $N_2O$ (%) | | | | |
|---|---|---|---|---|---|---|
| Example No. | Sources of catalyst | 300° C. | 360° C. | 380° C. | 460° C. | 490° C. |
| Application Example I-1 | Example I-1 | 41.6 | 95.4 | 100 | 100 | 100 |
| Application Example I-2 | Example I-2 | 37.7 | 94.2 | 99.6 | 100 | 100 |
| Comparative Application | Comparative Example I-1 | 8.2 | 43.7 | 76.4 | 93.6 | 99.1 |

TABLE I-1-continued

Results for Application Examples I-1 and I-2 and Comparative Application Examples I-1 and I-2

| | | Conversion of $N_2O$ (%) | | | | |
|---|---|---|---|---|---|---|
| Example No. | Sources of catalyst | 300° C. | 360° C. | 380° C. | 460° C. | 490° C. |
| Example I-1 Comparative Application Example I-2 | Commercially available nickel oxide | 0 | 12.4 | 17.6 | 51.3 | 76.2 |

From Table I-1 above, it can be seen that the carbon-coated nickel oxide nanocomposite material of the present application shows better catalytic performance for $N_2O$ decomposition than uncoated pure nickel oxide, and can catalyze the decomposition of $N_2O$ at a relatively low temperature range with high efficiency; the material of Comparative Example I-1 required a temperature of at least 490° C. to achieve a $N_2O$ conversion of greater than 99%; whereas the commercially available nickel oxide required a relatively higher decomposition temperature.

It can be seen that the nanocomposite material of the present application shows a good catalytic performance on the decomposition of nitrous oxide, and can be used for decomposition and elimination of $N_2O$ effectively at a low temperature. Thus, when the nanocomposite material is used for treating $N_2O$ in industrial production waste gases, such as for treating high-concentration $N_2O$ tail gas generated in the production process of adipic acid plants and nitric acid plants, the reaction temperature and the energy consumption can be greatly reduced, so that the nanocomposite material has a good industrial application prospect.

Application Example I-3

This application example is provided to illustrate the use of the nanocomposite material of Example I-1 as a catalyst for catalyzing the combustion of VOCs.

0.2 g of the catalyst was placed in a continuous flow fixed bed reactor, and a mixed gas comprising 0.5% by volume of n-butane, 8% by volume of oxygen, and a balance gas of nitrogen was introduced at a flow rate of 15 ml/min. The activity was evaluated at a temperature of 300-500° C., and the conversion of VOCs for the combustion catalyzed by the catalyst at different temperatures is shown in Table I-2.

Application Example I-4

The catalytic combustion of VOCs was carried out as described in Application Example I-3, except that the nanocomposite material of Example I-2 was used as the catalyst and the results are shown in Table I-2.

Comparative Application Example I-3

The catalytic combustion of VOCs was carried out as described in Application Example I-3, except that the material of Comparative Example I-1 was used as the catalyst, and the results are shown in Table I-2.

Comparative Application Example I-4

The catalytic combustion of VOCs was carried out as described in Application Example I-3, except that commercially available nickel oxide (NiO) (analytical pure, batch No.: 20160803, manufacturer: Sinopharm Chemical Reagent Company Limited) was used as the catalyst, and the results are shown in Table I-2.

TABLE 1-2

Results for Application Examples I-3 and I-4 and Comparative Application Examples I-3 and I-4

| | | Conversion of n-butane (%) | | | | |
|---|---|---|---|---|---|---|
| Example No. | Sources of catalyst | 300° C. | 350° C. | 400° C. | 450° C. | 500° C. |
| Application Example I-3 | Example I-1 | 85.7 | 94.6 | 100 | 100 | 100 |
| Application Example I-4 | Example I-2 | 91.2 | 100 | 100 | 100 | 100 |
| Comparative Application Example I-3 | Comparative Example I-1 | 18.2 | 59.7 | 86.4 | 93.6 | 100 |
| Comparative Application Example I-4 | Commercially available nickel oxide | 7.1 | 34.9 | 61.6 | 79.3 | 91.2 |

As can be seen from the above Table I-2, in the catalytic combustion evaluation experiment performed by using n-butane as a model molecule, the carbon-coated nickel oxide nanocomposite material of the present application shows better catalytic performance for VOCs combustion than uncoated pure nickel oxide. The uncoated nickel oxide catalyst requires a temperature of at least 500° C. for complete combustion of n-butane, while the material of the present application can efficiently catalyze the complete combustion of n-butane to produce carbon dioxide and water at a temperature of 350-400° C., thereby greatly reducing the reaction temperature and the energy consumption and thus has good industrial application prospect.

Example II-1

This example is provided to illustrate the preparation of the nitrogen-doped carbon-coated nickel oxide nanocomposite material of the present application.

(1) 10 g of nickel acetate, 10 g of citric acid and 20 g of hexamethylenetetramine were added into 100 mL of deionized water, stirred at 70° C. to obtain a homogeneous solution, and further heated till the solution was evaporated to dryness to obtain a solid precursor.

(2) The precursor was placed in a porcelain boat, then the porcelain boat was placed in a constant-temperature zone of a tube furnace, nitrogen was introduced at a flow rate of 100 mL/min, heated to 550° C. at a rate of 5° C./min, kept at the temperature for 2 h and then the heating was stopped, and the resultant was cooled to room temperature under a nitrogen atmosphere to obtain a black solid. The loss on acid washing of the black solid was 17.6% as measured and calculated by the method described above.

(3) The black solid obtained in the step (2) was placed in a porcelain boat, then the porcelain boat was placed in a constant-temperature zone of a tube furnace, an oxygen-containing gas (comprising 15% by volume of oxygen and a balance gas of nitrogen) was introduced at a flow rate of 100 mL/min, heated to 320° C. at a rate of 2° C./min, kept at the temperature for 8 hours and then the heating was stopped, and the resultant was cooled to room temperature under an atmosphere of the oxygen-containing gas to obtain a black solid, namely the nitrogen-doped carbon-coated nickel oxide nanocomposite material of the present application.

Figure 9:
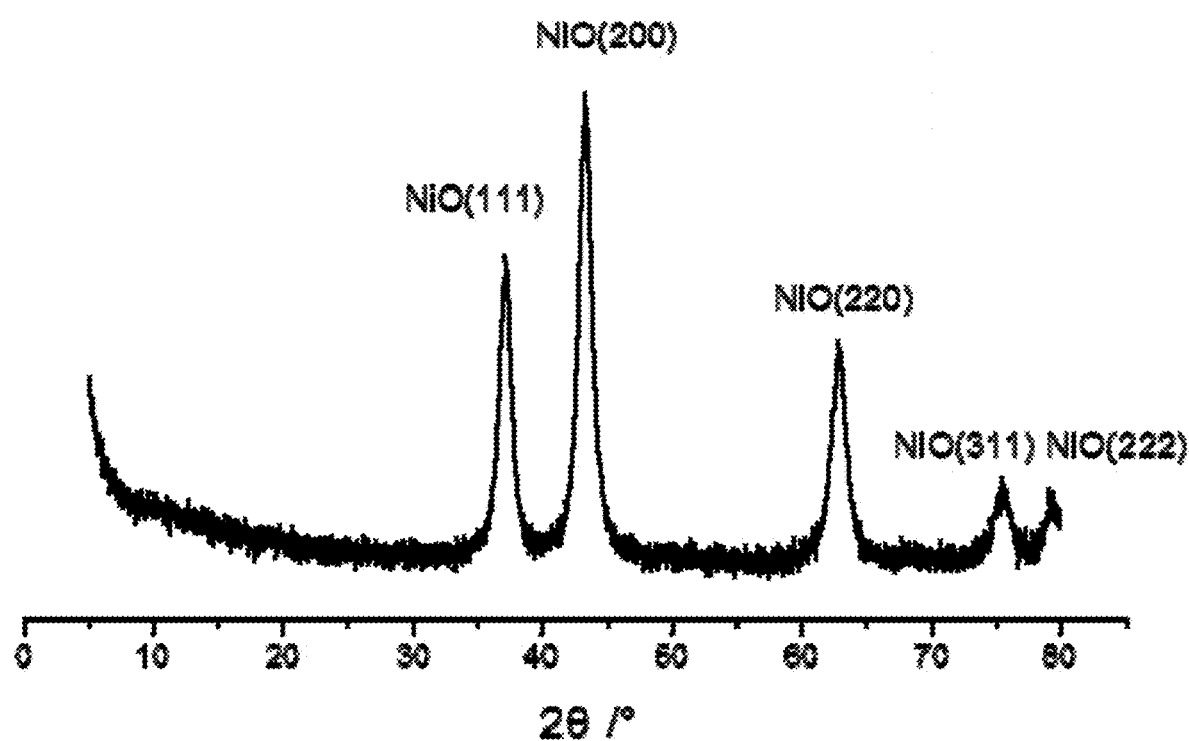
FIG. 9 shows an X-ray diffraction pattern of the nanocomposite material obtained in Example II-1.
Figure 10:
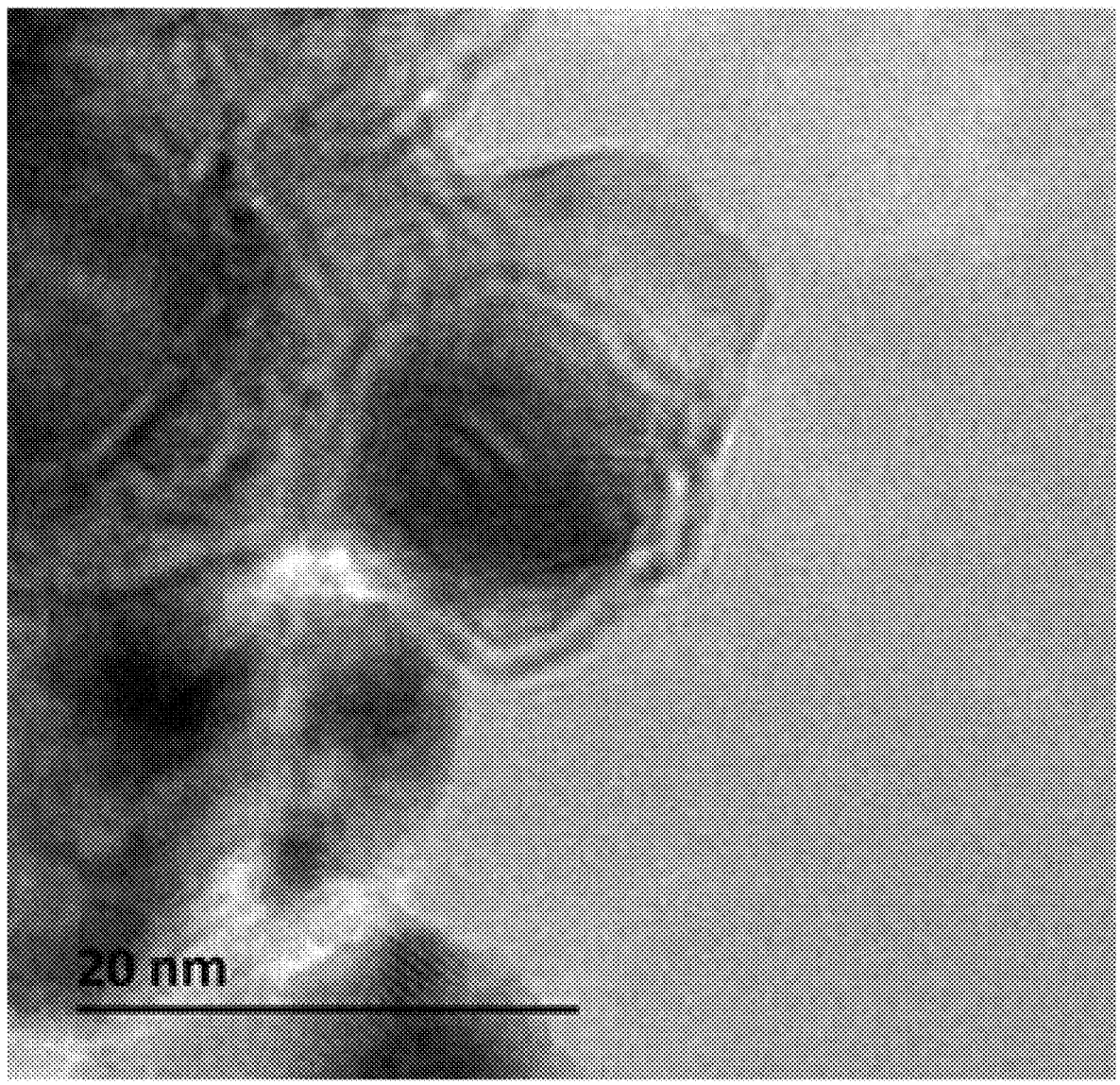
FIG. 10 shows a transmission electron micrograph of the nanocomposite material obtained in Example II-1.

The X-ray diffraction pattern (XRD) of the nitrogen-doped carbon-coated nickel oxide nanocomposite material is shown in FIG. 9, and its TEM image is shown in FIG. 10. It can be seen from FIG. 9 that nickel in the nanocomposite material is present in the form of an oxide after the mild oxidation treatment, and it can be seen from FIG. 10 that the nanocomposite material has a particle size of about 5-20 nm.

The nanocomposite material had a carbon content of 0.82 wt %, a nitrogen content of 0.01 wt %, and a nickel oxide content of 99.17 wt % as determined by elemental analysis.

In the elements on the surface layer of the nanocomposite material, carbon, nitrogen, oxygen and nickel are detected through XPS analysis, wherein the nitrogen content of the surface layer is 1.04 mol %, and the ratio of the carbon element mass content in the surface layer to the total carbon element mass content is 29.6/1, indicating that the carbon in the material is mainly present on the surface of the particles and nitrogen is doped into the carbon layer.

Figure 11:
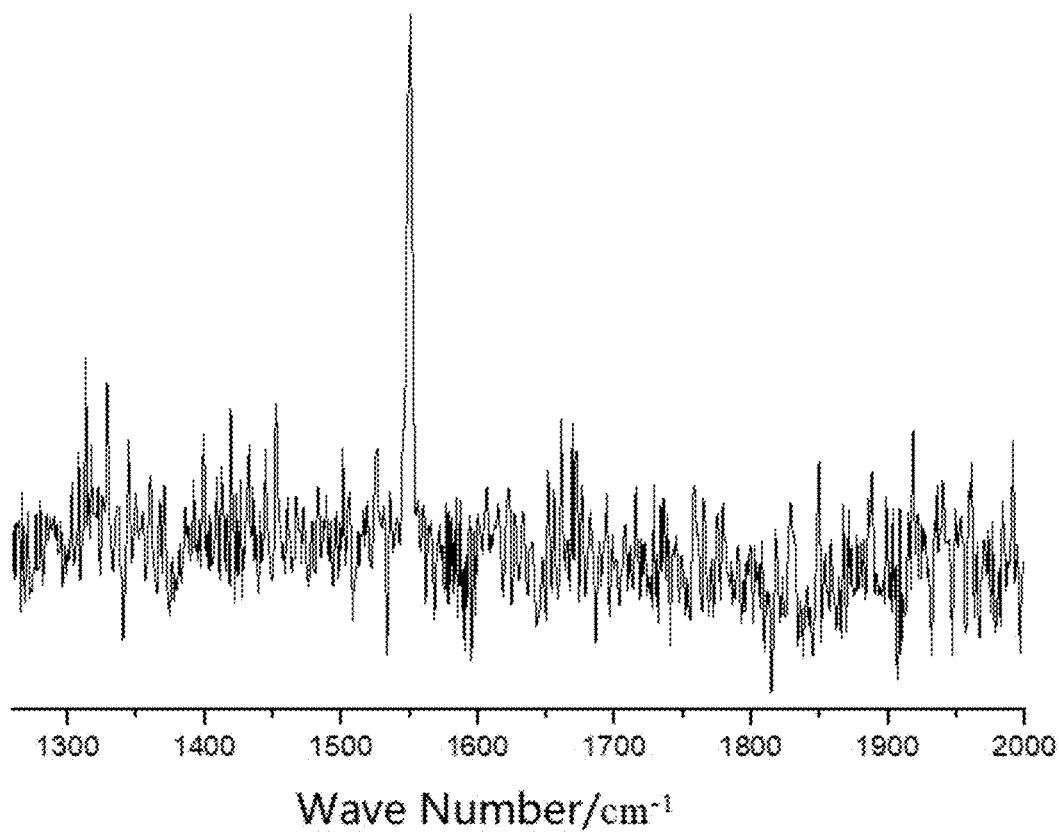
FIG. 11 shows a Raman spectrum of the nanocomposite material obtained in Example II-1.

FIG. 11 shows a Raman spectrum of the carbon-coated nickel oxide nanocomposite material of Example II-1, wherein the ratio of the intensity of the G peak (1580 cm$^{-1}$) to the intensity of the D peak (1320 cm$^{-1}$) is 2.1/1, indicating that most of the carbon in the material is graphitic carbon.

Example II-2

This example is provided to illustrate the preparation of the nitrogen-doped carbon-coated nickel oxide nanocomposite material of the present application.

(1) 20 g of nickel acetate and 10 g of ethylenediamine tetraacetic acid were added into 150 mL of deionized water, stirred at 60° C. and reacted for 24 h, further heated till the solution was evaporated to dryness, and the resulted solid was ground to obtain a solid precursor.

(2) The precursor was placed in a porcelain boat, then the porcelain boat was placed in a constant-temperature zone of a tube furnace, nitrogen was introduced at a flow rate of 100 mL/min, heated to 600° C. at a rate of 4° C./min, kept at the temperature for 2 h and then the heating was stopped, and the resultant was cooled to room temperature under a nitrogen atmosphere to obtain a black solid. The loss on acid washing of the black solid was 21.7% as measured and calculated by the method described above.

(3) The black solid obtained in the step (2) was placed in a porcelain boat, then the porcelain boat was placed in a constant-temperature zone of a tube furnace, an oxygen-containing gas (comprising 15% by volume of oxygen and a balance gas of nitrogen) was introduced at a flow rate of 100 mL/min, heated to 320° C. at a rate of 2° C./min, kept at the temperature for 8 hours and then the heating was stopped, and the resultant was cooled to room temperature under an atmosphere of the oxygen-containing gas to obtain a black solid, namely the nitrogen-doped carbon-coated nickel oxide nanocomposite material of the present application.

Figure 12:
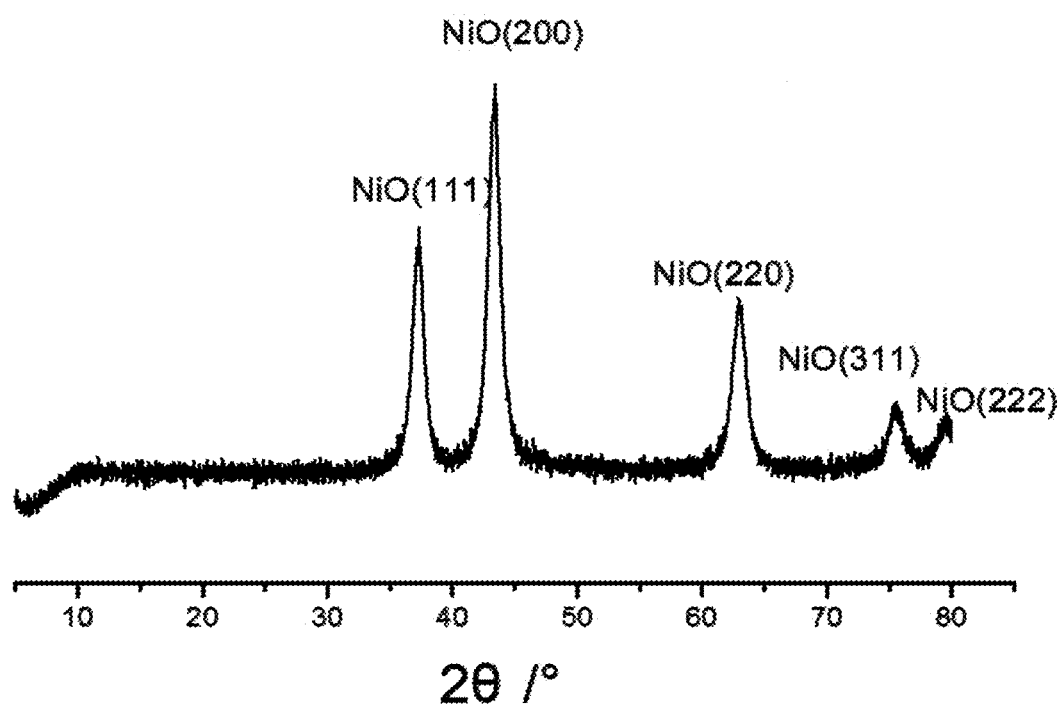
FIG. 12 shows an X-ray diffraction pattern of the nanocomposite material obtained in Example II-2.
Figure 13:
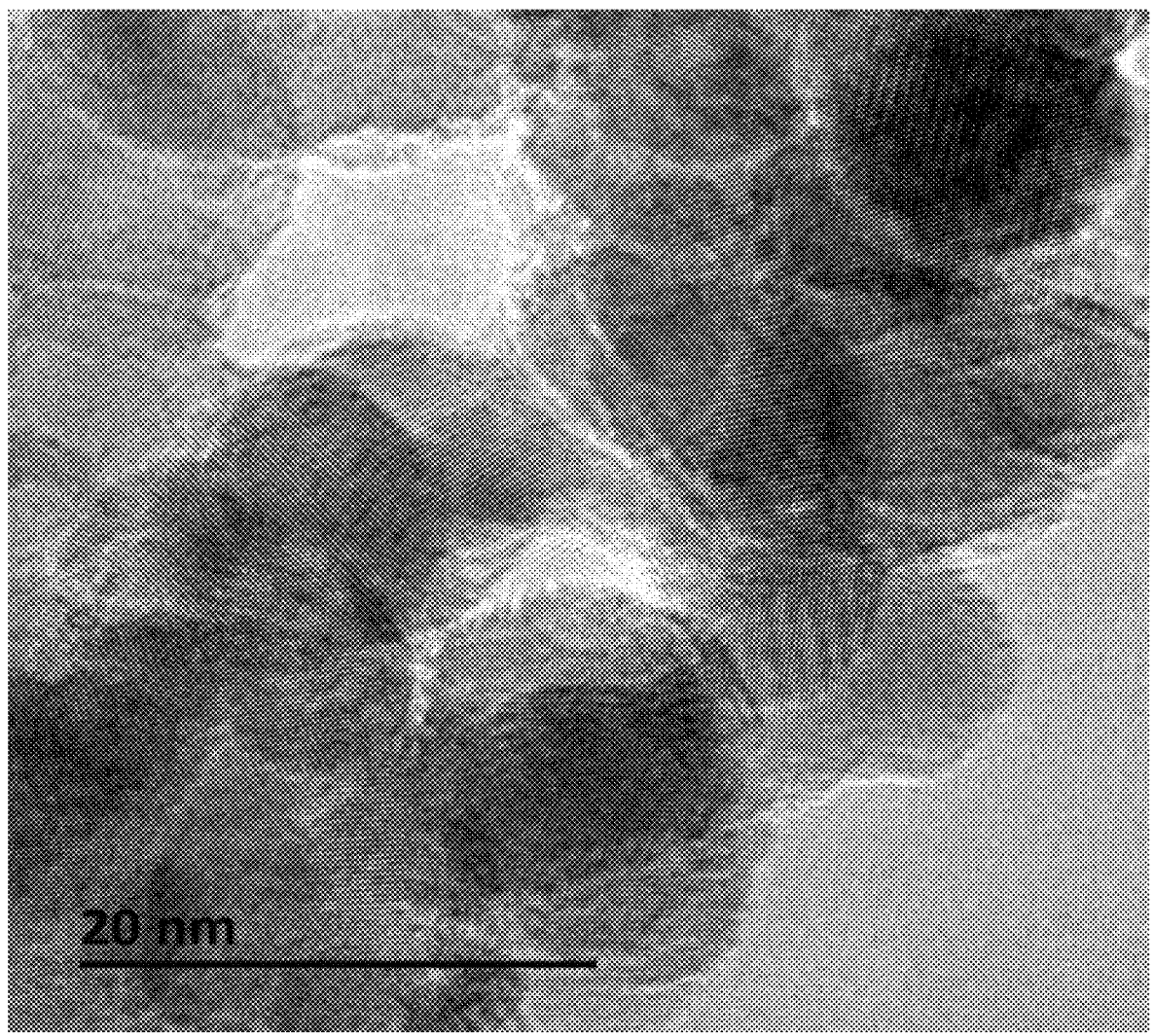
FIG. 13 shows a TEM image of the nanocomposite material obtained in Example II-2.

The X-ray diffraction pattern (XRD) of the nitrogen-doped carbon-coated nickel oxide nanocomposite material is shown in FIG. 12, and its TEM image is shown in FIG. 13. It can be seen from FIG. 12 that nickel in the nanocomposite material is present in the form of an oxide after the mild oxidation treatment, and it can be seen from FIG. 13 that the nanocomposite material has a particle size of about 5-20 nm.

The nanocomposite material had a carbon content of 0.62 wt %, a nitrogen content of 0.01 wt %, and a nickel oxide content of 99.37 wt % as determined by elemental analysis.

In the elements on the surface layer of the nanocomposite material, carbon, nitrogen, oxygen and nickel are detected through XPS analysis, wherein the nitrogen content of the surface layer is 0.91 mol %, and the ratio of the carbon element mass content in the surface layer to the total carbon element mass content is 26.9/1, indicating that the carbon in the nanocomposite material is mainly present on the surface of the particles and nitrogen is doped into the carbon layer.

Figure 14:
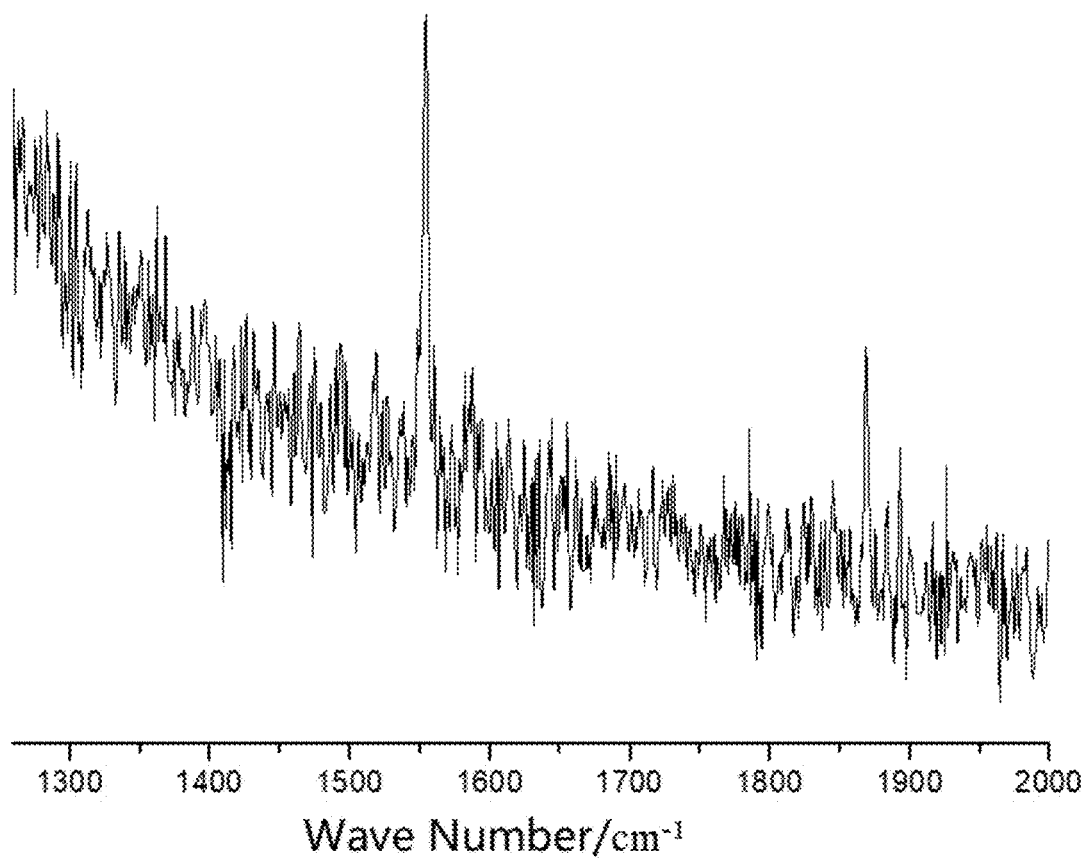
FIG. 14 shows a Raman spectrum of the nanocomposite material obtained in Example II-2.

FIG. 14 shows a Raman spectrum of a carbon-coated nickel oxide nanocomposite material of Example II-2, wherein the ratio of the intensity of the G peak (1580 cm$^{-1}$) to the intensity of the D peak (1320 cm$^{-1}$) is 2.4/1, indicating that most of the carbon in the material is graphitic carbon.

Application Example II-1

This application example is provided to illustrate the use of the nanocomposite material of Example II-1 for catalyzing the decomposition of nitrous oxide.

0.5 g of the catalyst was placed in a continuous flow fixed bed reactor, a mixed gas comprising 38.0% by volume of $N_2O$ and a balance gas of nitrogen was introduced at a flow rate of 15 ml/min. The activity was evaluated in a temperature range as shown in Table II-1, and the conversion of $N_2O$ for the decomposition catalyzed by the catalyst at different temperatures is shown in Table II-1.

Application Example II-2

$N_2O$ decomposition was carried out as described in Application Example II-1, except that the nanocomposite material of Example II-2 was used as the catalyst and the results are shown in Table II-1.

TABLE II-1

Results of Application Examples II-1 and II-2 and
Comparative Application Examples I-1 and I-2

| Example No. | Sources of catalyst | Conversion of $N_2O$ (%) | | |
|---|---|---|---|---|
| | | 300° C. | 360° C. | 380° C. |
| Application Example II-1 | Example 1 | 27.8 | 92.4 | 98.6 |
| Application Example II-2 | Example 2 | 32.1 | 93.1 | 99.1 |
| Comparative Application Example I-1 | Comparative Example I-1 | 8.2 | 43.7 | 76.4 |
| Comparative Application Example I-2 | Commercially available nickel oxide | 0 | 12.4 | 17.6 |

From Table II-1 above, it can be seen that the nitrogen-doped carbon-coated nickel oxide nanocomposite material of the present application shows better catalytic performance for $N_2O$ decomposition than uncoated pure nickel oxide, and can effectively catalyze the decomposition of $N_2O$ at a relatively low temperature.

Application Example II-3

This application example is provided to illustrate the use of the nanocomposite material of Example II-1 as a catalyst for catalyzing the combustion of VOCs.

0.2 g of the catalyst was placed in a continuous flow fixed bed reactor, a mixed gas comprising 0.5% by volume of n-butane, 8.0% by volume of oxygen, and a balance gas of nitrogen was introduced at a flow rate of 15 ml/min. The activity was evaluated in a temperature range as shown in Table II-2, and the conversion of VOCs for the combustion catalyzed by the catalyst at different temperatures is shown in Table II-2.

Application Example II-4

This application example is provided to illustrate the use of the nanocomposite material of Example II-2 as a catalyst for catalyzing the combustion of VOCs.

0.5 g of the catalyst was placed in a continuous flow fixed bed reactor, a mixed gas comprising 0.2% by volume of n-butane, 8.0% by volume of oxygen, and a balance gas of nitrogen was introduced at a flow rate of 15 ml/min. The activity was evaluated in a temperature range as shown in Table II-2, and the conversion of VOCs for the combustion catalyzed by the catalyst at different temperatures is shown in Table II-2.

TABLE II-2

Results for Application Examples II-3 and II-4 and
Comparative Application Examples I-3 and I-4

| Example No. | Sources of catalyst | Conversion of n-butane (%) | | |
|---|---|---|---|---|
| | | 300° C. | 350° C. | 400° C. |
| Application Example II-3 | Example II-1 | 86.2 | 96.7 | 100 |
| Application Example II-4 | Example II-2 | 92.1 | 100 | 100 |
| Comparative Application Example I-3 | Comparative Example I-1 | 18.2 | 59.7 | 86.4 |
| Comparative Application Example I-4 | Commercially available nickel oxide | 7.1 | 34.9 | 61.6 |

As can be seen from the above Table II-2, in the catalytic combustion evaluation experiment using n-butane as a model molecule, the nitrogen-doped carbon-coated nickel oxide nanocomposite material of the present application shows better catalytic performance for VOCs combustion than uncoated pure nickel oxide.

In the description above, the inventive concept of the present application has been described with reference to particular embodiments. However, it can be appreciated that various modifications and changes can be made without departing from the scope of the present application as set forth in the claims appended. Accordingly, the description and drawing should be considered illustrative rather than restrictive, and all such modifications and changes are intended to be covered by the scope of the present application.

The invention claimed is:

1. A carbon-coated nickel oxide nanocomposite material, comprising carbon-coated nickel oxide nanoparticles having a core-shell structure, with an outer shell being a graphitized carbon film optionally doped with nitrogen and an inner core comprising one or more nickel oxide nanoparticles,
   wherein the nanocomposite material has a carbon content of from greater than 0 wt % to not greater than about 5 wt %, based on the weight of the nanocomposite material, and
   wherein a surface of the nanocomposite material has a carbon element content of about 15-60 mol %, as determined by X-ray photoelectron spectroscopy; and/or a ratio of the carbon element mass content in a surface of the nanocomposite material determined by X-ray photoelectron spectroscopy to the carbon element mass content determined by elemental analysis of not less than about 10.

2. The nanocomposite material according to claim 1, wherein the nanocomposite material has a Raman spectrum in which a ratio of the intensity of the G peak near 1580 $cm^{-1}$ to the intensity of the D peak near 1320 $cm^{-1}$ is greater than about 2.

3. The nanocomposite material according to claim 1, wherein the outer shell of the core-shell structure is a nitrogen-doped graphitized carbon film and the nanocomposite material has a nitrogen element content of about 0.1-5 mol %, as determined by X-ray photoelectron spectroscopy.

4. The nanocomposite material according to claim 1, wherein the carbon-coated nickel oxide nanoparticles have a particle size of about 1-100 nm.

5. A method for preparing the carbon-coated nickel oxide nanocomposite material according to claim 1, comprising the steps of:
   i) mixing a nickel source, a polybasic organic carboxylic acid and optionally a nitrogen-containing compound in a solvent to form a homogeneous solution;

ii) removing the solvent from the homogeneous solution to obtain a precursor;

iii) pyrolyzing the precursor under an inert or reducing atmosphere; and iv) heat treating the pyrolyzed product in the presence of oxygen to obtain the nanocomposite material, wherein the nickel source is one or more selected from the group consisting of nickel powder, nickel hydroxide, nickel oxide, soluble organic acid salts of nickel, basic carbonates of nickel, and carbonates of nickel;

the polybasic organic carboxylic acid is one or more selected from the group consisting of citric acid, maleic acid, trimesic acid, terephthalic acid, gluconic acid, malic acid, ethylenediaminetetraacetic acid, dipicolinic acid, iminodiacetic acid, diethylenetriaminepentaacetic acid, and 1,3-propanediaminetetraacetic acid; and the nitrogen-containing compound is one or more selected from the group consisting of urea, melamine, dicyanodiamine, hexamethylenetetramine, and amino acids.

6. The method according to claim 5, wherein the heat treatment of step iv) comprises contacting an oxygen-containing gas with the pyrolyzed product at about 200-500° C. for about 0.5-10 h, wherein the oxygen-containing gas has an oxygen concentration by volume of about 10-40%.

7. The method according to claim 5, wherein, in step i), the nickel source is mixed with that polybasic organic carboxylic acid that is one or more selected from the group consisting of citric acid, maleic acid, trimesic acid, terephthalic acid, gluconic acid, and malic acid in the solvent, and the mass ratio of the nickel source to the polybasic organic carboxylic acid is about 1:(0.1-100).

8. The method according to claim 5, wherein, in step i), the nickel source is mixed with the polybasic organic carboxylic acid that is one or more selected from the group consisting of ethylenediaminetetraacetic acid, dipicolinic acid, iminodiacetic acid, acid, and diethylenetriaminepentaacetic 1,3-propylenediaminetetraacetic acid in the solvent, and the mass ratio of the nickel source to the polybasic organic carboxylic acid is about 1:(0.1-10).

9. The method according to claim 5, wherein, in step i), the nickel source, the polybasic organic carboxylic acid that is one or more selected from the group consisting of citric acid, maleic acid, trimesic acid, terephthalic acid, gluconic acid and malic acid and the nitrogen-containing compound are mixed in the solvent, and the mass ratio of the nickel source, the polybasic organic carboxylic acid and the nitrogen-containing compound is about 1:(0.1-10):(0.1-10).

10. The method according to claim 5, wherein the pyrolysis of step iii) comprises: heating the precursor in the inert or reducing atmosphere to a temperature of a constant-temperature stage, and maintaining the temperature for a period of time;

wherein the rate of heating is about 0.5-30° C./min, the temperature of the constant-temperature stage is about 400-800° C., the period of time is about 20-600 min, the inert atmosphere is nitrogen or argon, and the reducing atmosphere is a mixed gas of an inert gas and hydrogen.

11. A method for catalyzing the decomposition of nitrous oxide, comprising contacting nitrous oxide with a catalyst for catalytic decomposition to produce nitrogen and oxygen, wherein the catalyst comprises the nanocomposite material according to claim 1.

12. The method according to claim 11, wherein the catalytic decomposition is carried out at a reaction temperature of about 300-400° C., a reaction space velocity of about 1000-3000 ml of reaction gas/(hr·g of catalyst), and a volume concentration of nitrous oxide in the reaction gas of about 5-40%.

13. A method for treating volatile organic compounds, comprising contacting a volatile organic compound with a catalyst for oxidation reaction, wherein the catalyst comprises the nanocomposite material according to claim 1.

14. The method according to claim 13, wherein the oxidation reaction is carried out by bringing a mixed gas containing the volatile organic compound and oxygen into contact with the catalyst, and the mixed gas comprises about 0.01-2% by volume of the volatile organic compound, and about 5-20% by volume of oxygen, and the volatile organic compound is one or more selected from the group consisting of $C_1$-$C_4$ hydrocarbon compounds.

15. The method according to claim 13, wherein the oxidation reaction is carried out at a reaction temperature of about 300-450° C. and a reaction space velocity of about 1000-5000 ml of reaction gas/(hr·g of catalyst).

16. The nanocomposite material according to claim 1, wherein the nanocomposite material has a carbon content of about 0.4-0.95 wt %, based on the weight of the nanocomposite material, a ratio of the carbon element mass content the nanocomposite material determined by X-ray photoelectron spectroscopy to the carbon element mass content determined by elemental analysis of about 20-40, and a ratio of the intensity of the G peak near 1580 $cm^{-1}$ to the intensity of the D peak near 1320 $cm^{-1}$ is greater than about 2 and not greater than about 3.

* * * * *